United States Patent [19]
Huzinec et al.

[11] Patent Number: 5,139,797
[45] Date of Patent: Aug. 18, 1992

[54] STABILIZED SWEETENER COMPOSITIONS, CHEWING GUM COMPOSITIONS CONTAINING SAME AND METHODS FOR THEIR PREPARATION

[75] Inventors: Robert Huzinec, Carol Stream; Terry Schindeldecker, Naperville, both of Ill.

[73] Assignee: Leaf, Inc., Bannockburn, Ill.

[21] Appl. No.: 515,868

[22] Filed: Apr. 27, 1990

[51] Int. Cl.$^5$ .............................................. A23G 3/30
[52] U.S. Cl. ........................................ 426/3; 426/548; 426/658; 426/804
[58] Field of Search ................................ 426/3–6, 426/548, 804, 654

[56] References Cited

U.S. PATENT DOCUMENTS

| | | | |
|---|---|---|---|
| 3,642,491 | 2/1972 | Schlatter | 99/28 |
| 3,647,480 | 3/1972 | Cermak | 99/140 R |
| 3,753,739 | 8/1973 | Cella et al. | 99/141 A |
| 3,867,556 | 2/1975 | Darragh et al. | 426/98 |
| 3,928,633 | 12/1975 | Shoaf et al. | 426/96 |
| 3,943,258 | 3/1976 | Bahoshy et al. | 426/3 |
| 3,947,600 | 3/1976 | Rousseau | 426/302 |
| 3,949,094 | 4/1976 | Johnson et al. | 426/99 |
| 3,956,507 | 5/1976 | Shoaf et al. | 426/96 |
| 3,976,794 | 8/1976 | Johnson et al. | 426/103 |
| 3,982,023 | 9/1976 | Bahoshy et al. | 426/3 |
| 4,001,456 | 1/1977 | Glicksman et al. | 426/548 |
| 4,004,039 | 1/1977 | Shoaf et al. | 426/548 |
| 4,036,992 | 7/1977 | Bahoshy et al. | 426/3 |
| 4,051,265 | 9/1977 | Shires et al. | 426/548 |
| 4,059,706 | 11/1977 | Pischke et al. | 426/548 |
| 4,079,151 | 3/1978 | Schade et al. | 426/96 |
| 4,086,557 | 5/1978 | Bakal et al. | 426/3 |
| 4,105,801 | 8/1978 | Dogliotti | 426/99 |
| 4,122,195 | 10/1978 | Bahoshy et al. | 426/3 |
| 4,139,639 | 2/1979 | Bahoshy et al. | 426/3 |
| 4,153,737 | 5/1979 | Berg et al. | 426/548 |
| 4,156,740 | 5/1979 | Glass et al. | 426/3 |
| 4,241,091 | 12/1980 | Stroz et al. | 426/4 |
| 4,246,286 | 1/1981 | Klose et al. | 426/3 |
| 4,248,894 | 2/1981 | Mackay et al. | 426/3 |
| 4,252,830 | 2/1981 | Kehoe et al. | 426/5 |
| 4,293,572 | 10/1981 | Silva et al. | 426/19 |
| 4,316,915 | 2/1982 | Friello et al. | 426/5 |
| 4,357,354 | 11/1982 | Kehoe et al. | 426/3 |
| 4,374,858 | 2/1983 | Glass et al. | 426/5 |
| 4,382,924 | 5/1983 | Berling et al. | 424/180 |
| 4,384,004 | 5/1983 | Cea et al. | 426/3 |
| 4,465,694 | 8/1984 | Okada | 426/3 |
| 4,472,437 | 9/1984 | Corsello et al. | 426/3 |
| 4,486,455 | 12/1984 | Wolf et al. | 426/548 |
| 4,495,213 | 1/1985 | Wolf et al. | 426/548 |
| 4,501,759 | 2/1985 | Gajewski | 426/96 |
| 4,508,740 | 4/1985 | McSweeney | 426/250 |
| 4,514,422 | 4/1985 | Yang et al. | 426/3 |
| 4,517,214 | 5/1985 | Shoaf et al. | 426/548 |
| 4,540,587 | 9/1985 | Gajewski | 426/96 |
| 4,582,707 | 4/1986 | Calabro | 426/4 |
| 4,597,970 | 7/1986 | Sharma et al. | 426/5 |
| 4,612,195 | 9/1986 | Puglia et al. | 426/3 |
| 4,626,441 | 12/1986 | Wolkstein | 426/548 |
| 4,634,593 | 1/1987 | Stroz et al. | 426/5 |
| 4,673,577 | 6/1987 | Patel | 426/5 |
| 4,704,288 | 11/1987 | Tsau et al. | 426/99 |
| 4,711,784 | 12/1987 | Yang | 426/5 |
| 4,738,854 | 4/1988 | Friello et al. | 426/3 |
| 4,762,930 | 8/1988 | Rieger et al. | 548/106 |
| 4,774,094 | 9/1988 | Carroll et al. | 426/3 |
| 4,780,324 | 10/1988 | Knebl et al. | 426/3 |
| 4,800,095 | 1/1989 | Carroll et al. | 426/548 |
| 4,803,083 | 2/1989 | Chapdelaine et al. | 426/3 |
| 4,808,418 | 2/1989 | Zamudio-Tena et al. | 426/5 |
| 4,820,528 | 4/1989 | Stroz et al. | 426/3 |
| 4,822,621 | 4/1989 | Glass et al. | 426/5 |
| 4,822,622 | 4/1989 | Dokuzovic et al. | 426/5 |

FOREIGN PATENT DOCUMENTS 1212257 9/1986 Japan .................................... 426/548

*Primary Examiner*—Jeanette Hunter
*Attorney, Agent, or Firm*—Lockwood, Alex, FitzGibbon & Cummings

[57] ABSTRACT

Compositions and matrices comprising aspartame, microcrystalline cellulose and glycerin which stabilize the aspartame against decomposition are disclosed. Also disclosed are compositions and matrices comprising an ingestible anhydrous metal salt, aspartame and glycerine which stabilize the aspartame against decomposition. These compositions and matrices are useful in various comestibles, particularly chewing gum, and prolong the sweetness shelf life of the comestible incorporating them.

45 Claims, 22 Drawing Sheets

STABILIZED SWEETENER COMPOSITIONS, CHEWING GUM COMPOSITIONS CONTAINING SAME AND METHODS FOR THEIR PREPARATION

FIELD OF THE INVENTION

This invention relates to stabilizing aspartame and to its use in comestible products. More particularly, it relates to products having a method for producing, aspartame stabilized against decomposition so as to prolong the sweetness life of the aspartame. Although capable of a variety of uses, this invention finds advantageous utility in chewing gum.

BACKGROUND OF THE INVENTION

In recent years aspartame, L-as-partyl-L-phenylalanine methyl ester (also known as APM), and related dipeptide sweeteners have become important artificial sweeteners for a variety of products, especially chewing gum. Aspartame has gained popularity as an artificial sweetener for a number of reasons including its high degree of sweetness estimated to be about 100-160 times the sweetness of sucrose on a weight to weight basis. Aspartame also is perceived to have a more sucrose like taste relative to other available artificial sweeteners such as saccharin which has been perceived to possess a bitter aftertaste.

A high sweetness value would ordinarily reduce the relative amount of sweetener needed to sweeten a comestible such as chewing gum. Although aspartame has a relatively high sweetness value it unfortunately also has exhibited a tendency to undergo hydrolytic degradation in the presence of moisture resulting in subsequent loss of sweetness. This hydrolytic degradation may accelerate at elevated temperatures and specific pH ranges. Aspartame is also known to react with chemicals such as aldehydes and ketones with subsequent loss of sweetness. Some degree of moisture is always present in comestibles and many comestible flavorings contain aldehydes. Additionally, comestibles, especially chewing gum which may be warehoused after manufacture and stocked thereafter, may be exposed to elevated temperatures at various times during their shelf life and/or may not reach the end user until months after produced.

In order to maintain a desired minimum sweetness level throughout their expected shelf life, products sweetened with aspartame can be formulated with excess aspartame to compensate for decomposition of the aspartame over time. For comestibles having a relatively long shelf life, such as chewing gum where the expected shelf life is at least several months, this approach can, however, produce a product which is perceived to be overly sweet if used early in its life. Additionally, adding excess aspartame to compensate for decomposition over time can be expensive due to the cost of aspartame. Another approach to maintaining a desired minimum sweetness level throughout the expected shelf life of a product sweetened with aspartame is to prevent materials such as water and aldehydes from degrading the aspartame so as to extend its shelf life and the corresponding sweetness life of the product containing it.

Numerous attempts have been made and reported in the literature on methods for stabilizing aspartame. Unfortunately none of the methods have completely solved the problem. Perhaps the method of stabilizing aspartame that has been attempted the most is the encapsulation of the aspartame.

U.S. Pat. No. 4,711,784 to Yang discloses encapsulating aspartame with a high molecular weight polyvinyl acetate blended with a hydrophobic plasticizer. According to this patent, aspartame so encapsulated retained 69% of the aspartame after 65 weeks at 20° C.

U.S. Pat. No. 4,590,075 to Wei et al. discloses encapsulating the aspartame in a matrix comprising at least one elastomer; at least one elastomer solvent; at least one wax system and an excipient selected from the group consisting of carbohydrates, polyhydric alcohols and mixtures thereof and optionally containing spherical food particles having microporous channels and a bulk density of 32.4 to about 400.46 kilograms/m$^3$.

U.S. Pat. No. 4,384,004 to Cea et al. discloses the encapsulation of aspartame with a coating material selected from the group consisting of cellulose, cellulose derivatives, arabino-galactin, gum arabic, polyolefins, waxes, vinyl polymers, gelatin, zein and mixtures thereof.

U.S. Pat. No. 4,139,639 to Bahosky et al. discloses the encapsulation of aspartame with a composition consisting of gum arabic and a specified starch acid-ester.

U.S. Pat. No. 4,673,577 to Patel discloses encapsulating aspartame with food-grade shellac which, according to the patent, forms a substantially impermeable coating and minimizes the degradation of the aspartame to diketopiperazine or its reaction with aldehydes.

In addition to encapsulation, other techniques have been attempted to improve the instability of the aspartame with differing results.

U.S. Pat. No. 4,822,622 to Dokuzovic al. discloses a barrier between the aspartame and the gum base containing the flavoring.

U.S. Pat. No. 4,514,422 to Yang et al. discloses a gum composition containing a maximum of 2% water comprising a substantially anhydrous mixture of a gum base, at least one sugar alcohol and glycerin in an amount of from about 8% to about 18% by weight of the total gum composition. According to the patent, aspartame can be used as an artificial sweetener in this composition.

U.S. Pat. No. 4,774,094 to Carroll et al. discloses stabilizing aspartame by combining it with hydrogenated starch hydrolysate having a cooked moisture content of about 10±6%.

A review of the above-mentioned patents and other literature on the attempts to stabilize aspartame, indicates there is still a need to increase the stability of this artificial sweetener in a variety of products, particularly chewing gum.

It is therefore an object of the present invention to improve the stability of aspartame.

Another object of the present invention is to provide stable compositions containing aspartame that are useful as artificial sweeteners for a variety of comestible products.

Another object of the present invention is to provide a system for reducing the amount of aspartame sweetener needed to sweeten chewing gum and other artificially sweetened products to maintain a minimum desired sweetness level during the expected shelf life of the product by providing aspartame in a form which retards its degradation over time.

Another obJect of this invention is to provide aspartame sweetened chewing gum which retains its sweetness for extended periods of time.

Another object of the present invention is to provide a method for the production of a comestible containing aspartame stabilized against decomposition.

Other objects will become apparent from the ensuing description.

SUMMARY OF THE INVENTION

The sweetener compositions of the present invention comprise aspartame and an ingestible hygroscopic metallic salt. In a preferred embodiment the aspartame and the metallic salt are combined with glycerin and formed in a matrix. The matrix can be formed by use of equipment such as a single blade agitator that fold in the components of the matrix. The matrix can be aerated by sufficient mixing to produce a relatively light weight low density, e.g. 0.2 g/ml to 0.8 g/ml, material resembling a foam. The matrix can include additional components such as microcrystalline cellulose. Compositions comprising aspartame, glycerin, and microcrystalline cellulose in an aerated matrix form are also disclosed. The aspartame compositions of the present invention are useful in the preparation of comestibles, especially in the preparation of chewing gum, and provide such comestibles with a prolonged sweetness life.

DETAILED DESCRIPTION OF THE INVENTION

Figure 1:
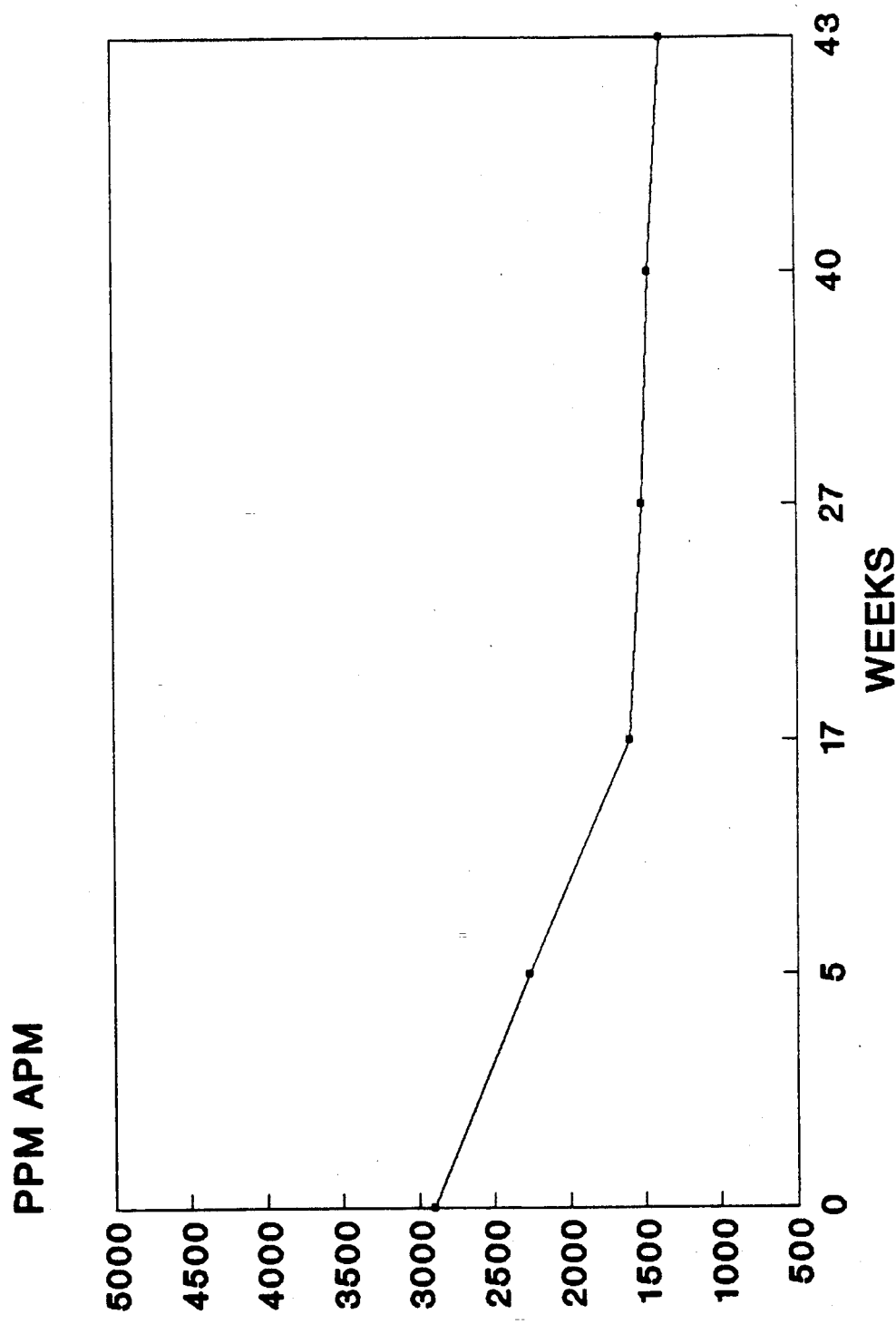
FIG. 1 is a graph of parts per million of aspartame vs. time for the product of Example 13 at room temperature.

In general the aspartame compositions of the present invention incorporate an ingestible hygroscopic metal salt and aspartame. Typically, the hygroscopic metal salt is anhydrous or partially anhydrous and capable of being hydrated. It has been found that the use in a comestible of aspartame with a metal salt capable of hydration prolongs the sweetness life of the comestible, i.e. stabilizes the aspartame against decomposition whereby maintaining a desired level of aspartame for a longer time. It is hypothesized, without being limited to any particular theory of the invention, that the metal salt acts as a dessicant and scavenges moisture to help prevent the decomposition of the aspartame and extend its sweetness life. Preferably, the metal salt also promotes an acidic, about 2–5, pH range to help stabilize the aspartame from decomposition.

Examples of ingestible anhydrous metal salts which can be used are aluminum sulfate, calcium chloride, ferrous sulfate, ferric citrate, ferric pyrophosphate, and the like. Preferred metal salts are calcium chloride and aluminum sulfate. The amount of anhydrous metal salt that need be present for purposes of the invention will in general depend on the capability of the metal salt to undergo hydration. It has been found that in comestibles, such as chewing gum sweetened with aspartame, that the aspartame is acceptably stabilized against decomposition by incorporating with it an equivalent stoichiometric amount of metal salt based on the theoretical amount of water of hygoration for the particular metal salt selected. In general, the equivalent amount of anhydrous me al salt used can for convenience be computed on a weight basis rather than on a molar basis. Typically, the amount of metal salt used will be from about 0.5 to about 1.5 times the weight of the aspartame used divided by the theoretical amount of water of hydration of that particular anhydrous metal salt. The preferred weight amount of the anhydrous metal salt to be incorporated into the matrix will include a small excess, i.e. 10%, over the weight of the aspartame divided by the water of hydration number of the anhydrous metal salt. Thus, for example, in the situation when aluminum sulfate is the anhydrous metal salt, the preferred grams to aluminum sulfate would be $$1.1 \times \frac{\text{grams of aspartame}}{18}$$

Preferably, the aspartame containing compositions of the present invention comprise aspartame, hygroscopic metal salt and a liquid binding agent together in the form of an aerated matrix. Typically, the aspartame is present in an effective sweetening amount. The liquid binding agent can be glycerin, hydrogenated starch hydrolysate, propylene glycol and the like. Preferably, the liquid binding agent is glycerin. In this regard, it should be appreciated that normal food grade glycerin is acceptable for use, i.e. the glycerin need not be anhydrous. Additionally, the matrix can also include an excepient or suspending agent such as microcrystalline cellulose, sodium carboxymethyl cellulose, mixtures thereof, and gums such as gum arabic to promote delivery of the matrix.

The present invention also encompasses compositions comprising aspartame, a liquid binding agent such as glycerin and an excipient or suspending agent such as microcrystalline cellulose in the form of an aerated matrix. These compositions, without the presence of an hygroscopic metal salt, have also been found useful to stabilize aspartame against decomposition and prolong the sweetness shelf life of comestibles containing such cell positions.

More particularly the preferred matrix comprises from about 70 to about 10 weight percent glycerin, from about 1 to about 20 weight percent microcrystalline cellulose, from about 1 to about 10 weight percent aspartame, and an appropriate amount of an ingestible hygroscopic metal salt. More preferably, the present compositions comprise from about 85 to about 90 weight percent glycerin, from about 5 to about 10 weight percent microcrystalline cellulose, from about 3 to about 5 weight percent aspartame and an appropriate amount of hygroscopic metal salt. It will be appreciated that the amount of the hygroscopic metal salt will depend on the amount of aspartame present and preferably will be present in a weight amount about 1.1 times the weight of aspartame present divided by the effective water of hydration number of the metal salt.

Commercial microcrystalline cellulose often contains sodium carboxymethyl cellulose as a component. This mixture results from the process to convert alpha cellulose to microcrystalline cellulose. Such a product is sold by FMC Corporation is the colloidal grade of Avicel (Avicel is a Trademark of FMC Corporation). Consequently when this form of microcrystalline cellulose is used to prepare the matrix, sodium carboxymethyl cellulose will also be present in the matrix.

The aerated matrix is prepared by the use of standard equipment such as a cobart mixer that permits the folding of the components so as to form air spaces in the matrix containing the aspartame. A single blade kettle or like equipment will suffice. The aspartame containing matrix has a foam-like appearance. Yet despite its texture, the present matrix extends the sweetness life of the aspartame. In general the density of the matrix is from about 0.2 to about 0.8 grams/milliter.

The compositions of the present invention have utility in a variety of comestible products, including but not limited to chewing gum, candy, and other products in which aspartame is used as a sweetener. One of the principal products using aspartame for which the composition of the present invention has applicability is chewing gum.

In general chewing gum compositions containing the aerated matrix of the present invention comprise:

| Component | Weight Percent General | Preferred |
| --- | --- | --- |
| Gum Base | 15–35 | 20–30 |
| Aerated Matrix | 1–20 | 2–10 |
| Bulking Agents | 50–75 | 60–70 |
| Flavor | 0.5–5 | 1–3 |

The gum bases useful in the present invention, include those gum bases utilized, respectively, for chewing gums or bubble gums. Both bases may be any water insoluble gum base known in the art. Thus, included can be natural or synthetic elastomers such as butadiene-styrene copolymers, polyisobutylene and isobutylene-isoprene copolymers; natural gums or elastomers such as chicle, natural rubber Jelutong, balata, guttapercha, lechi caspi, sorva, guttakay, crown gum, perillo or mixtures thereof. Among these, butadiene-styrene copolymer, polyisobutylene, isobutylene-iso-prene copolymer or mixtures, are frequently used.

The gum base usually includes an elastomer solvent, which may be selected from terpene resins, such as polymers of $\alpha$-pinene or $\beta$-pinene; rosin derivatives including hydrogenated or partially hydrogenated derivatives, such as the glycerol ester of polymerized rosin, alcohol esters of rosin, such as the glycerol ester of hydrogenated rosin, the pentaerythritol ester of hydrogenated rosin, the pentaerythritol ester of partially hydrogenated rosin, the glyceryl esters of partially hydrogenated rosin, the glyceryl ester of rosin and mixtures thereof.

The gum base may include a non-toxic vinyl polymer, such as polyvinyl acetate and its partial hydrolyzate, polyvinyl alcohol, and mixtures thereof. When utilized, the vinyl polymer may possess a molecular weight ranging from abut 3,000 up to and including 94,000.

The base may include an oleaginous plasticizer, such as hydrogenated vegetable oil, cocoa butter, natural waxes, petroleum waxes such as the polyethylene waxes, paraffin waxes, and microcrystalline waxes with melting ranges starting at higher than 80° C., or mixtures thereof. These materials may be utilized generally as softeners.

The gum base may include mineral adjuvants such as calcium carbonate, magnesium carbonate, alumina, aluminum hydroxide, aluminum silicate, talc, tricalcium phosphate and the like, as well as mixtures thereof. These mineral adjuvants may serve as fillers and texturing agents.

Fatty acids may also be included, to serve as softeners, and suitable fatty acids would include stearic acid, palmitic acid, oleic acid, and mixtures thereof. The gum bases also frequently include emulsifiers, particularly those that would be compatible with the vinyl polymer, if included in the base. Particularly, lecithin, glyceryl monostearate, fatty acid monoglycerides, diglycerides and triglycerides, glycerol triacetate, propylene glycol monostearate and mixtures thereof may be used.

The gum base composition may also include conventional additive such as antioxidants, preservatives, colorants and the like. For example, titanium dioxide may be utilized as a colorant, and an antioxidant such as butylated hydroxytoluene, butylated hydroxyanisole, propyl gallate, and mixtures thereof, may also be included.

Naturally, the gum bases may be prepared for a variety of products, including conventional gums and bubble gums, and the invention is not limited to a specific gum base fprmulation. The above description is therefore presented for purposes of illustration only. Regardless of the gum base employed, the gum composition of the present invention generally includes such gum base in an amount ranging from about 15% to 35% by weight of the total composition (unless otherwise specified, stated percentages are by weight of the total composition). In addition to the ingredients limited above, includable within the gum base, the gum compositions may also include a variety of additional adjuvant materials, such as plasticizers, softeners, thickeners, and, of course, various flavors.

Useful plasticizers or softeners, include lanolin, propylene glycol, glycerin (in addition to that supplied by the matrix) and the like, and mixtures of these, and are included optionally to achieve desired texture and consistency of the final gum composition. Typically, ranges for these softeners can be from 0-5% and preferably from 0-1%.

The gum compositions may also contain thickeners, that may be employed alone or in conjunction with other softeners. The thickeners may include methyl cellulose, alginates, carrageenan, xanthan gum, gelatin, carob, tragacanth, locust bean, and carboxy methyl cellulose. Typically, ranges for these thickeners can be from 0-10%, and preferably between 0.5%-2%.

In addition, various bulking agents can be included in the composition. Bulking agents which also input sweetening are preferred. Ingredients including corn syrup sugars, sucrose, dextrose, maltose, sugar alcohols such as sorbitol, mannitol xylitol and the other sugar alcohols as well as hydrolyzed cereal solids, are comtemplated and may be included herein. Typical ranges for these ingredients can be from 25% to 75% and preferably from 50%-60%.

The gum compositions may contain a variety of flavors alone or in mixture with each other, depending upon the type of gum is is desired to prepare. Particularly, flavors useful in the present invention include essential oils, such as cinnamon, spearmint, peppermint, birch, anise and the like; natural fruit flavors derived from the essence of fruits, such as apple, pear, peach, strawberry, cherry, apricot, orange, watermelon, banana and the like; bean-derived flavors, such as coffee, cocoa and the like; wine-derived flavors, such as curacao zin and the like; and pungent materials, such as affinin, pepper, mustard and the like. Typically, the flavoring will be present in an amount up to 3% and preferably at about 1.5%. It would be appreciated that certain flavors such as cinnamon may accelerate decomposition of the aspartame faster than other flavors.

The preparation of compositions in accordance with the present invention is illustrated by the following examples 1-7.

EXAMPLE 1

Glycerin (88 parts by weight) and aspartame (4 parts by weight) were placed in a Hobart bowl and mixed slowly at room temperature until the components were dispersed. Then the Avicel microcrystalline cellulose (8 parts by weight) was added thereto and the three components were mixed at a low speed until there was complete dispersion. The speed of the mixer was increased and the mixing continued until an aerated condition was achieved. The density of this product was determined by comparison to the weight of water/ml to be 0.70 grams/ml and the product's pH was 6.1. After 10 weeks at room temperature an HPLC analysis indicated all of the aspartame remained in the matrix with no appreciable decomposition.

EXAMPLE 2

Glycerin (2627.7 grams, was placed in a Hobart bowl and mixed with the mixer set at speed #1. Aspartame (109.8 grams) was added to the glycerin and mixed at this low speed until it was completely dispersed, usually within five months. Avicel Type RC-591F microcrystalline cellulose (262.8 grams) was added to the mixture in the Hobart bowl and mixed for 5 minutes with the speed of the mixer at speed #2 and then mixed for an additional 5 minutes at the higher speed of the mixer designated #3. This product was found to have a density of 0 73 grams/ml.

The matrices of Examples 3-7 were satisfactorily prepared using the procedure of Example 2 .

EXAMPLE 3

|  | Weight (Grams) | Percent |
| --- | --- | --- |
| Glycerin | 1818 | 90.0 |
| Avicel RC-591F | 174 | 8.7 |
| Aspartame | 8 | 0.4 |

The product had a density of 0.62 grams/ml.

EXAMPLE 4

|  | Weight (Grams) | Percent |
| --- | --- | --- |
| Glycerin | 2631 | 87.69 |
| Avicel RC-591F | 261 | 8.70 |
| Aspartame | 108 | 3.61 |

EXAMPLE 5

|  | Weight (Grams) | Percent |
| --- | --- | --- |
| Glycerin | 2465 | 82.18 |
| Avicel RC-591F | 246 | 8.20 |
| Aspartame | 289 | 9.62 |

EXAMPLE 6

|  | Weight (Grams) | Percent |
| --- | --- | --- |
| Glycerin | 2629 | 87.64 |
| Avicel RC-591F | 263 | 8.75 |
| Aspartame | 108 | 3.61 |

EXAMPLE 7

|  | Weight (Grams) | Percent |
| --- | --- | --- |
| Glycerin | 2465 | 82.18 |
| Avicel RC-591F | 246 | 8.20 |
| Aspartame | 289 | 9.62 |

Some of the following examples illustrate the preparation of compositions of the present invention containing an anhydrous metal salt. For purposes of illustration these examples show the use of specific salts such as aluminum sulfate; however, the present invention should not be construed as being limited thereto.

EXAMPLE 8

The procedure of Example 2 was repeated with the following components in the stated amounts.

|  | Weight (Grams) | Percent |
|---|---|---|
| Glycerin | 5246 | 87.44 |
| Avicel RC-591F | 522 | 8.70 |
| Aluminum Sulfate | 15 | 0.25 |
| Aspartame | 217 | 3.61 |

This product had a density of 0.55 grams/ml.

EXAMPLE 9

Glycerin (1748 grams) was placed in a Hobart bowl. Avicel RC-591F (174 grams) and aluminum sulfate (5 grams) were premixed and screened using a 200 mesh screen. This premix was added slowly to the glycerin in the Hobart bowl and mixed for 14 minutes at a speed setting of 1. It was then mixed for 5 minutes at a speed setting of 2 and then it was mixed for 5 minutes at a speed setting of 3. It was then removed from the Hobart bowl for use.

EXAMPLE 10

Avicel RC-591F (261 grams), aluminum sulfate (8 grams) and aspartame (108 grams) were screened using a 20 mesh screen. Glycerin (2623 grams) was placed in a Hobart boil and mixing started at speed #1. The premixed Avice RC-591F, aluminum sulfate and aspartame were added to the glycerin over a 12 minute addition time. Then it was mixed for 5 minutes at the #2 speed, followed by 15 minutes of mixing at the #3 speed. The matrix was removed from the Hobart bowl and placed into a container.

EXAMPLE 11

The procedure of Example 10 was repeated with the following components in the stated amounts.

|  | Weight (Grams) | Percent |
|---|---|---|
| Glycerin | 2458 | 81.93 |
| Avicel RC-591F | 246 | 8.20 |
| Aluminum Sulfate | 8 | 0.25 |
| Aspartame | 289 | 9.62 |

The matrix was removed from the Hobart bowl and placed into a container.

The following examples illustrate the preparation of the gum compositions of the present invention using the matrices previously described as the sweetener and the improvement in the stability of the aspartame contained therein. In the tests, unless otherwise stated, the aspartame content of product maintained at room temperature (70° F., 50% RH) and at 105° F. (25% RH). was determined at time intervals. In the Examples, PPM means parts per million by weight. Aspartame content of the samples was determined by HPLC. Stick gum was packaged in metalized foil packets. These examples are for purpose of illustration and the present invention should not be construed as being limited thereto.

EXAMPLE 12

Preparation of Sugarless Gum

Gumbase (196 grams) was placed in a Hobart bowl and melted. Mannitol (56 grams) and sorbitol (195.8 grams) were added to the gumbase and mixed for 2 minutes The matrix of Example 2 (48 grams) was added to this mixture which was mixed for an additional 3 minutes. Then the remainder of the sorbitol (195.8 grams) was added followed by an additional 2 minutes of mixing. Peppermint flavor (8.4 grams) was added with an additional 3 minutes of mixing. Then the gum was rolled into sheets and cut into squares.

After being maintained at room temperature for one month, the aspartame contents of the gum was 86 weight percent of the initial amount. After 10 weeks at room temperature, the aspartame content of the gum was 80 weight percent of the initial amount

EXAMPLE 13

Preparation of Sugarless Bubble Gum

Gumbase (140 grams), lecithin (2.1 grams) and the matrix of Example 6 (56 grams) were added to a Hobart bowl and mixed for 2 minutes. Sorbitol (241 grams) was added thereto and mixed for 2 minutes. Glycerin (14 grams) was added and mixed an additional 2 minutes. Additional sorbitol 241 grams), fruit flavor (5.6 grams) and pink color solution (0.28 grams) were added, followed by an additional 3 minutes of mixing. A portion of this gum product was maintained at room temperature and analyzed intervallicly for aspartame content. A second portion of this gum product was maintained at a temperature of 105° F. and intervallicly analyzed for aspartame content with the following result:

| | Aspartame Content | | | |
|---|---|---|---|---|
| | Room Temperature | | 105° F. | |
| Week | PPM | Percent of Initial Amount | PPM | Percent of Initial Amount |
| 0 | 2900 | 100 | 2900 | 100 |
| 5 | 2262 | 78.00 | — | — |
| 6 | — | — | 1886 | 65.03 |
| 9 | — | — | 861 | 28.59 |
| 11 | — | — | 666 | 22.99 |
| 17 | 1601 | 55.21 | — | — |
| 27 | 1518 | 52.34 | — | — |
| 40 | 1462 | 50.41 | — | — |
| 43 | 1378 | 47.52 | — | — |

Figure 2:
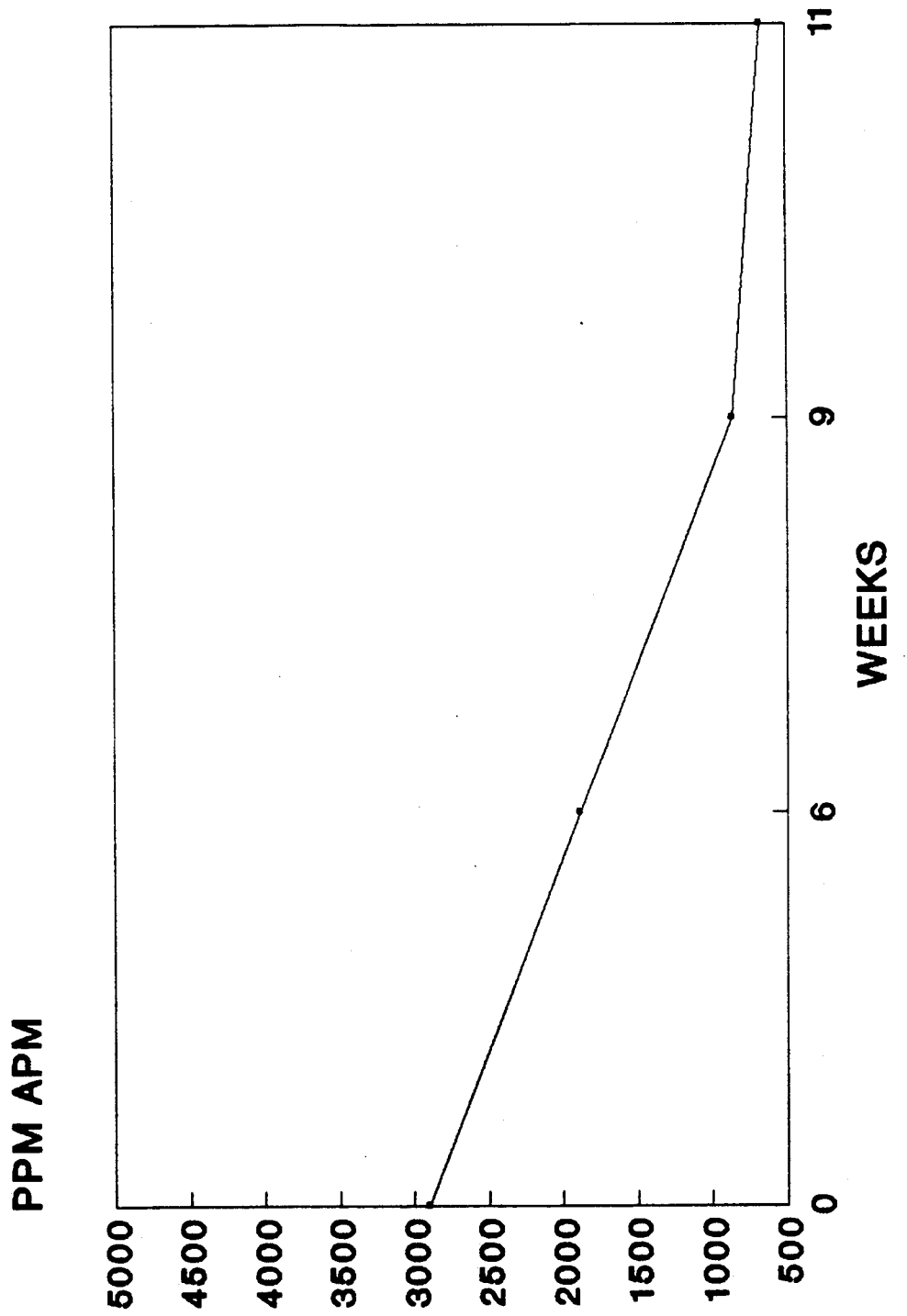
FIG. 2 is a graph of parts per million of aspartame vs. time for the product of Example 13 undergoing accelerated aging.

The test results at room temperature are graphically depicted in FIG. 1 and the test results at 105° F. are graphically depicted in FIG. 2.

EXAMPLE 14

Preparation of Bubble Gum

The procedure of Example 13 was repeated except that the matrix of Example containing aluminum sulfate was used in the preparation of the bubble gum with the following results:

| | Aspartame Content | | | |
|---|---|---|---|---|
| | Room Temperature | | 105° F. | |
| Week | PPM | Percent of Initial Amount | PPM | Percent of Initial Amount |
| 0 | 2900 | 100 | 2900 | 100 |

-continued

| | Aspartame Content | | | |
|---|---|---|---|---|
| | Room Temperature | | 105° F. | |
| Week | PPM | Percent of Initial Amount | PPM | Percent of Initial Amount |
| 5 | 2827 | 97.48 | — | — |
| 6 | — | — | 2062 | 71.10 |
| 9 | — | — | 1783 | 61.48 |
| 11 | — | — | 1598 | 55.10 |
| 17 | 2481 | 85.55 | — | — |
| 27 | 2420 | 83.45 | — | — |
| 40 | 2219 | 76.51 | — | — |
| 43 | 2159 | 74.44 | — | — |

Figure 3:
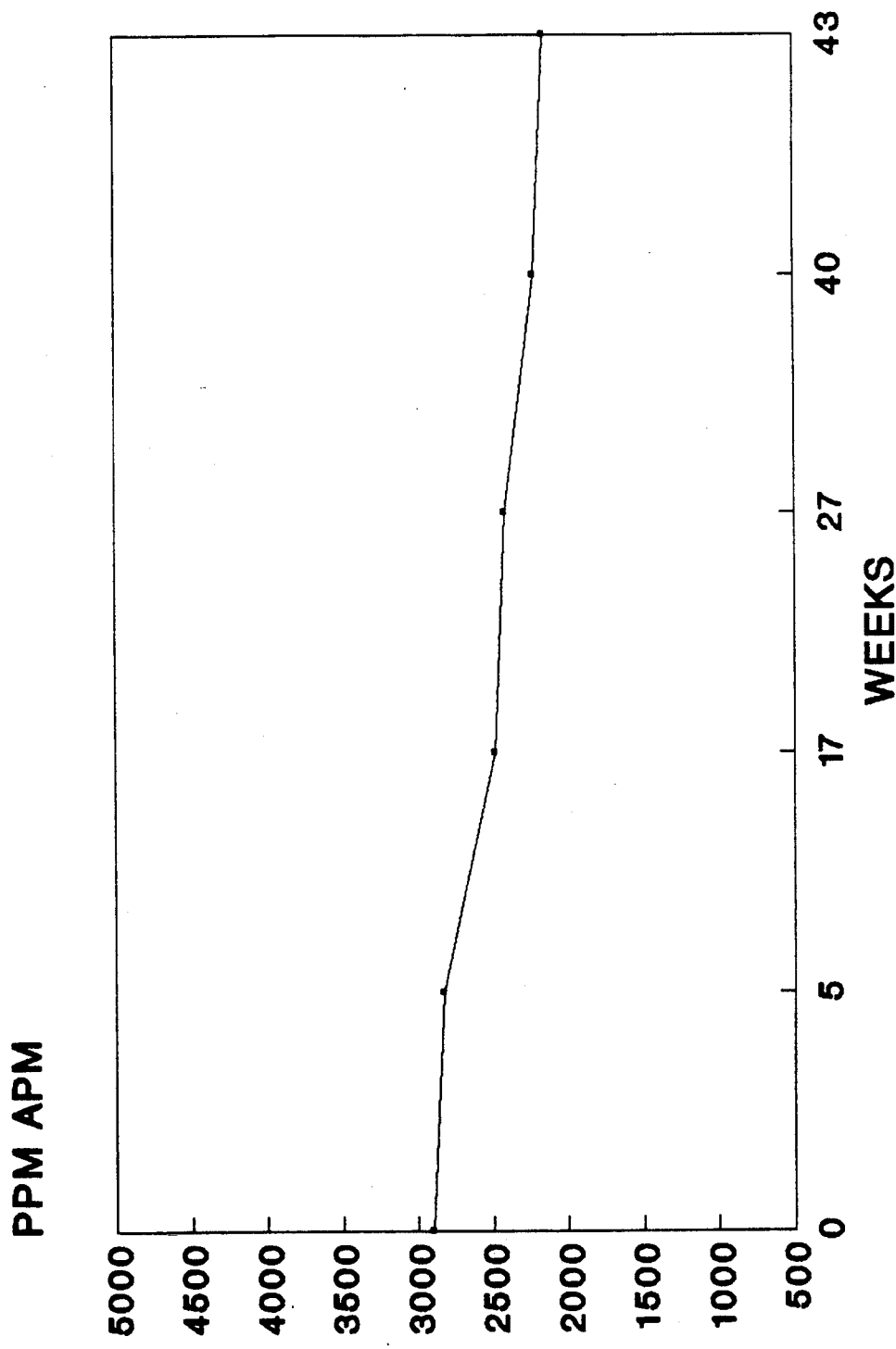
FIG. 3 is a graph of parts per million of aspartame vs. time for the product of Example 14 at room temperature.
Figure 4:
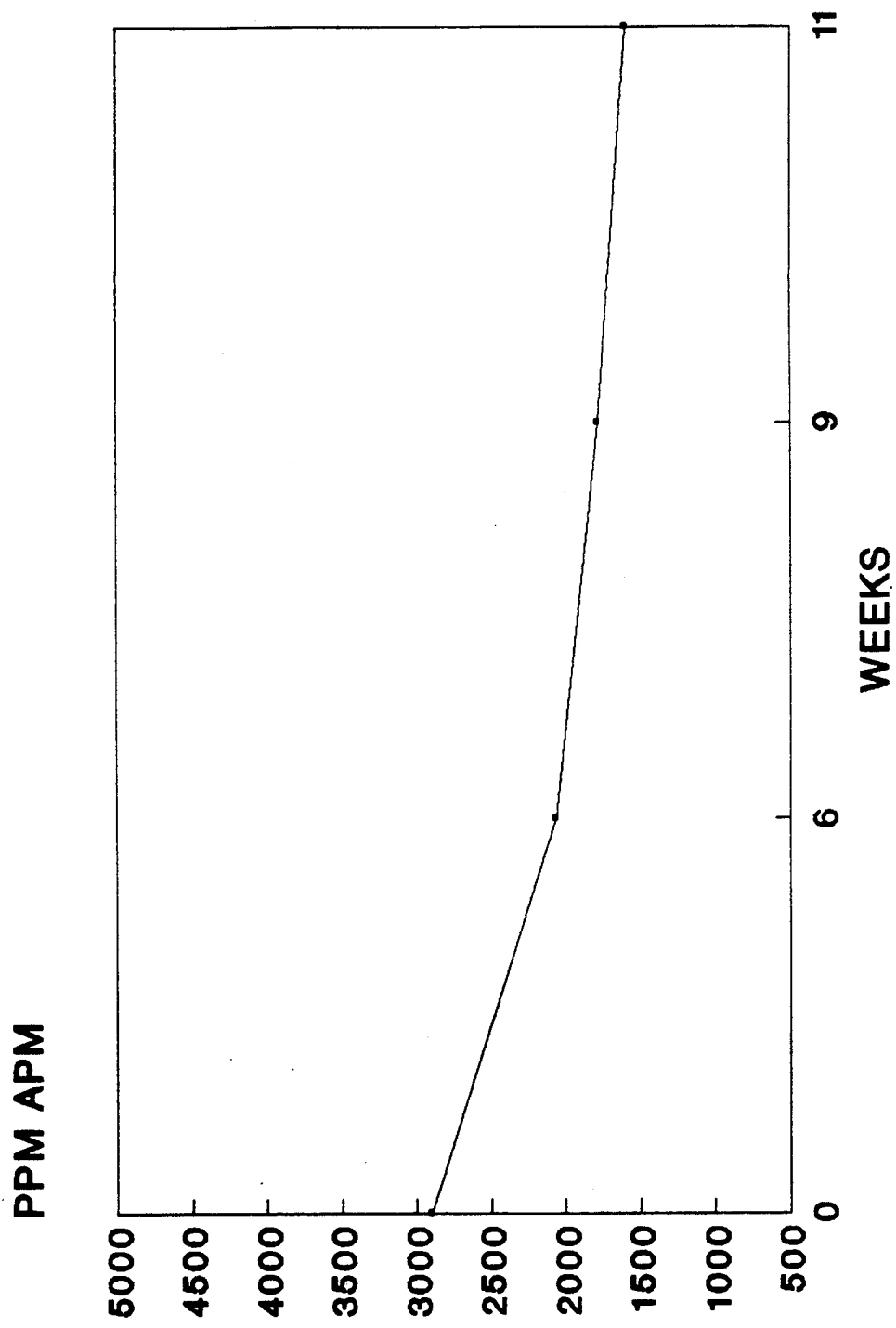
FIG. 4 is a graph of parts per million of aspartame vs. time for the product of Example 14 undergoing accelerated aging.

The test results at room temperature are graphically depicted in FIG. 3 and the test results at 105° F. are graphically depicted in FIG. 4.

EXAMPLE 15

Preparation of Bubble Gum

Gumbase (140 grams) wa° placed into a warm kettle. After stirring for 10 minutes, lecithin (2.1 grams), pink color (0.28 grams), sorbitol (241 grams) and matrix of Example 6 (56 gram) were added to the gum base and stirred for 4 minutes. Fruit flavor (5.6 grams) and the remainder of the sorbitol (241 grams) were then added to the contents of the kettle with stirring for 4 minutes. Glycerine (14 grams) was added and 3 minutes later the gum was removed from the kettle. A portion of the gum was maintained at room temperature and another portion was kept at 105° F. Each test gum was analyzed over time for aspartame content with the following ingredients:

| | Aspartame Content | | | |
|---|---|---|---|---|
| | Room Temperature | | 105° F. | |
| Week | PPM | Percent of Initial Amount | PPM | Percent of Initial Amount |
| 0 | 2806 | 100 | 2806 | 100 |
| 4 | — | — | 2328 | 82.97 |
| 7 | — | — | 1868 | 66.57 |
| 11 | 2674 | 95.30 | 732 | 26.09 |
| 21 | 2457 | 87.56 | — | — |
| 34 | 2213 | 78.87 | — | — |
| 38 | 2132.6 | 76.00 | — | — |

Figure 5:
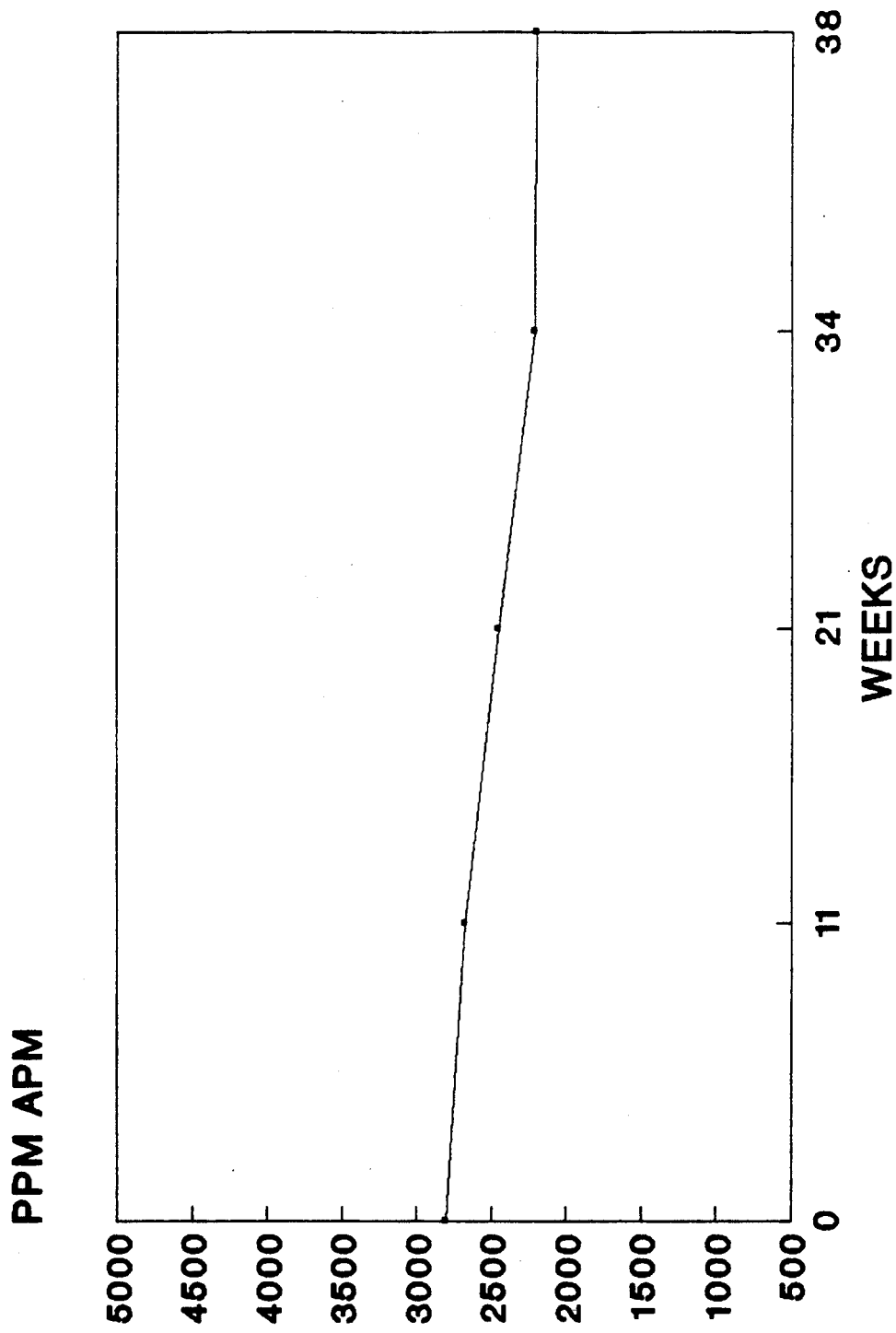
FIG. 5 is a graph of parts per million of aspartame vs. time for the product of Example 15 at room temperature.
Figure 6:
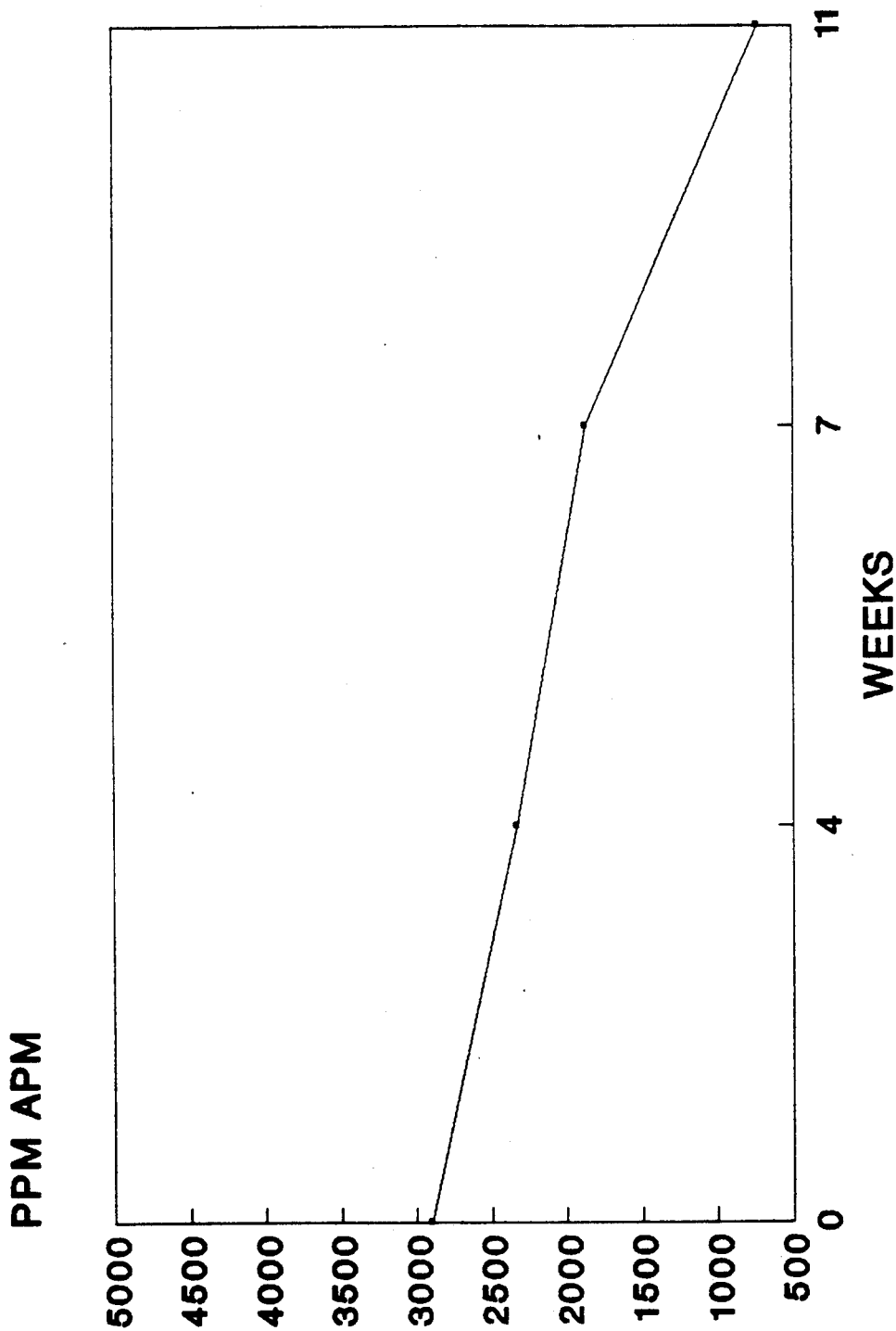
FIG. 6 is a graph of parts per million of aspartame vs. time for the product of Example 15 undergoing accelerated aging.

The test results at room temperature are graphically depicted in FIG. 5 and the test results at 105° F. are graphically depicted in FIG. 6.

EXAMPLE 16

Preparation of Bubble Gum

The procedure of Example 15 was repeated except that the matrix of Example 9 containing aluminum sulfate was used in the preparation of the bubble gum with the following results:

| | Aspartame Content | | | |
|---|---|---|---|---|
| | Room Temperature | | 105° F. | |
| Week | PPM | Percent of Initial Amount | PPM | Percent of Initial Amount |
| 0 | 3144 | 100 | 3144 | 100 |
| 4 | — | — | 2848 | 91.46 |
| 7 | — | — | 2340 | 75.14 |
| 11 | 2895 | 92.08 | 1424 | 45.73 |
| 21 | 2841 | 90.36 | — | — |
| 34 | 2644 | 84.91 | — | — |
| 38 | 2605 | 82.85 | — | — |

Figure 7:
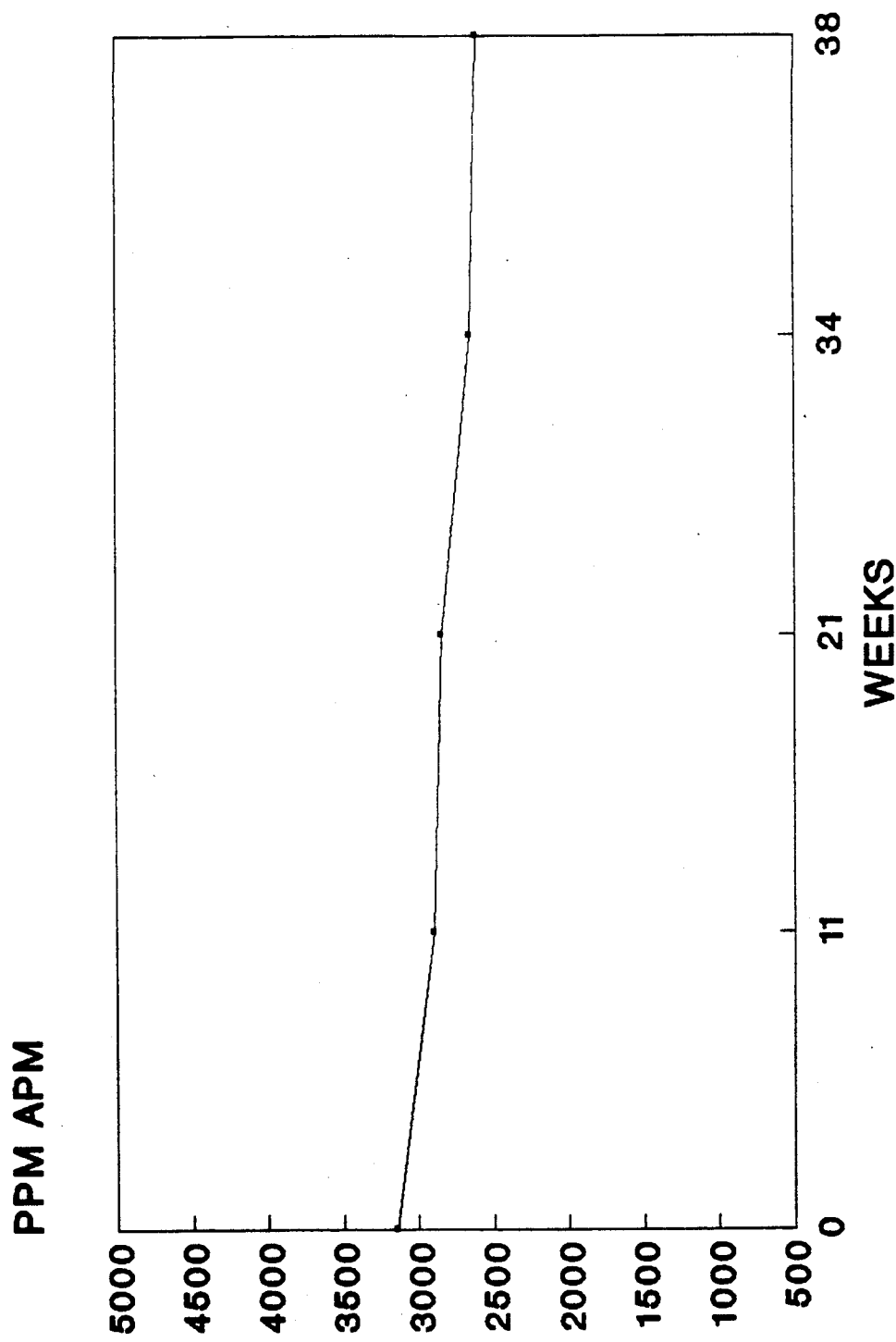
FIG. 7 is a graph of parts per million of aspartame vs. time for the product of Example 16 at room temperature.
Figure 8:
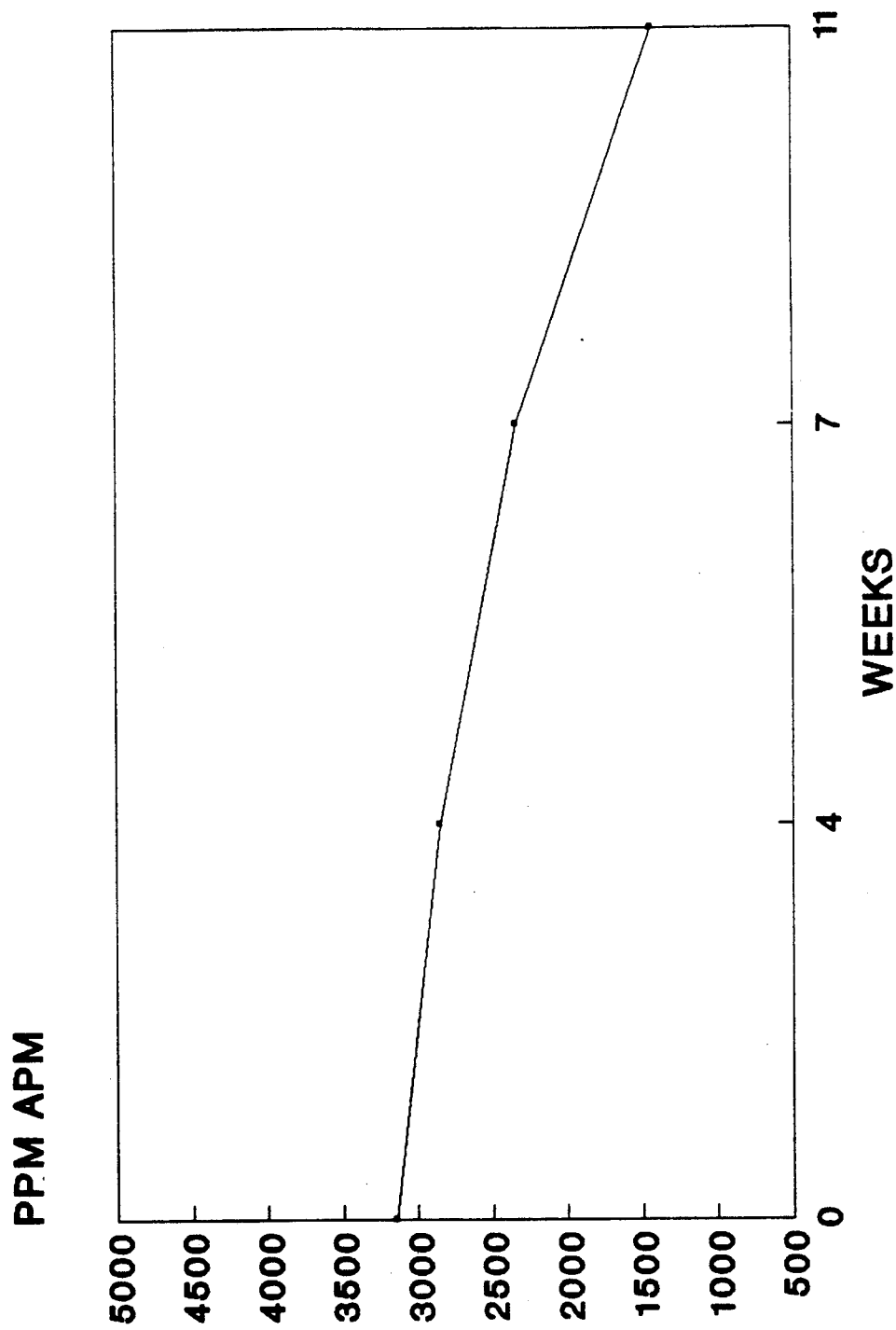
FIG. 8 is a graph of parts per million of aspartame vs. time for the product of Example 16 undergoing accelerated aging.

The test results at room temperature are graphically depicted in FIG. 7 and the test results at 105° F. are graphically depicted in FIG. 8.

EXAMPLE 17

Preparation of Slab and Stick Gum

Gum base (312 grams) and calcium carbonate (78 grams) were placed in a warm kettle and mixed. Lecithin (4.5 grams), sorbitol (475 grams) and the matrix of Example 8 were added thereto and stirred. The remainder of the sorbitol (475 grams) and peppermint flavor (18 grams) were then added and the product stirred an additional 5 minutes. A portion of this product was formed into slab shaped pieces and a portion of the product was formed into sticks for testing.

(a) The slab shaped gram was tested for stability of the aspartame with the following results:

| | Aspartame Content | | | |
|---|---|---|---|---|
| | Room Temperature | | 105° F. | |
| Week | PPM | Percent of Initial Amount | PPM | Percent of Initial Amount |
| 0 | 3543 | 100 | 3543 | 100 |
| 3 | — | — | 3109 | 87.75 |
| 9 | — | — | 2213 | 62.46 |
| 11 | — | — | 1960 | 55.32 |
| 12 | 3028 | 85.46 | — | — |
| 13 | — | — | 1695 | 47.84 |
| 15 | — | — | 1267 | 35.76 |
| 17 | 3001 | 84.70 | 662 | 18.68 |
| 22 | 2982 | 84.17 | — | — |
| 27 | 2873 | 81.09 | — | — |
| 31 | 2599 | 73.36 | — | — |

Figure 9:
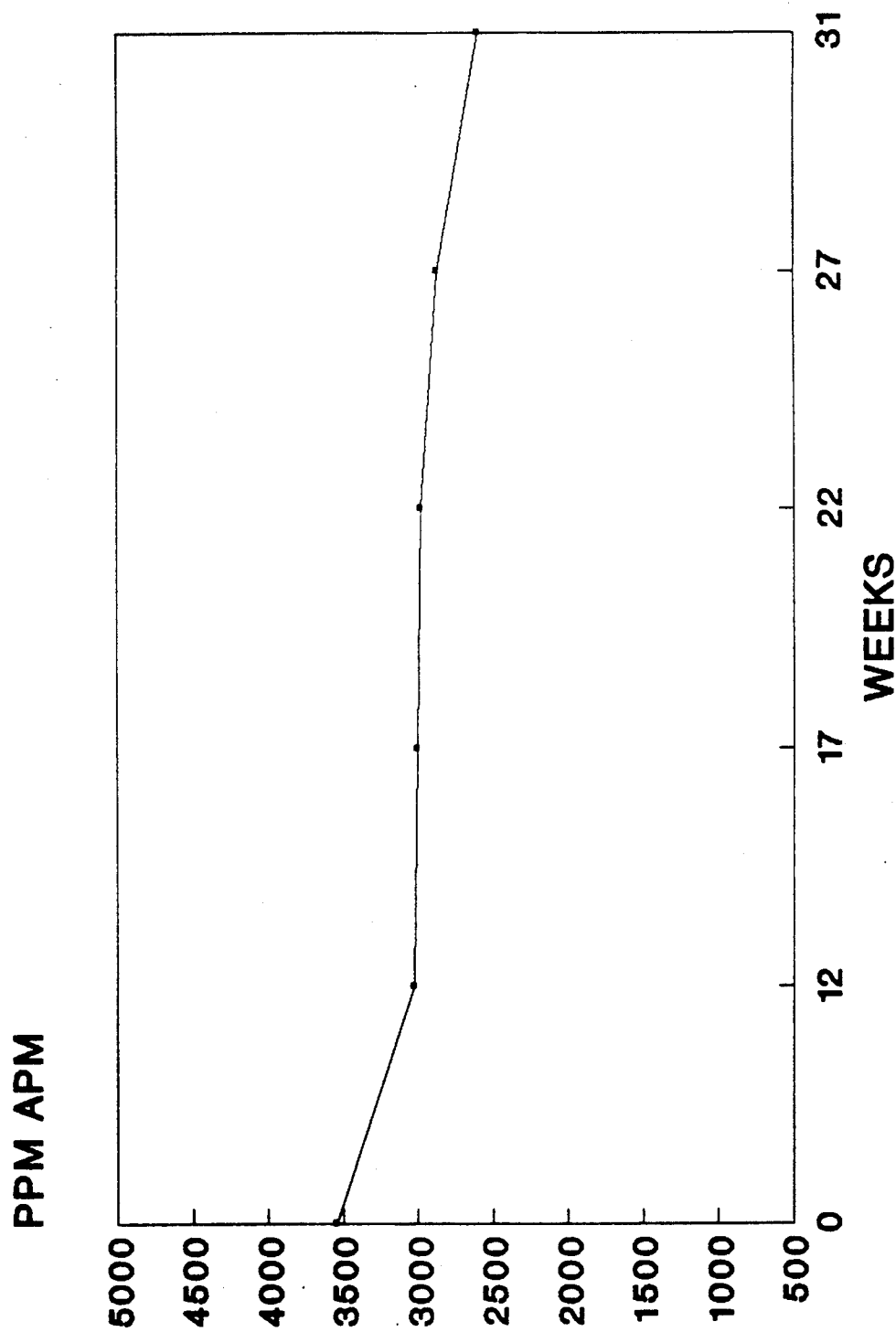
FIG. 9 is a graph of parts per million of aspartame vs. time for the slab product of Example 17 at room temperature.
Figure 10:
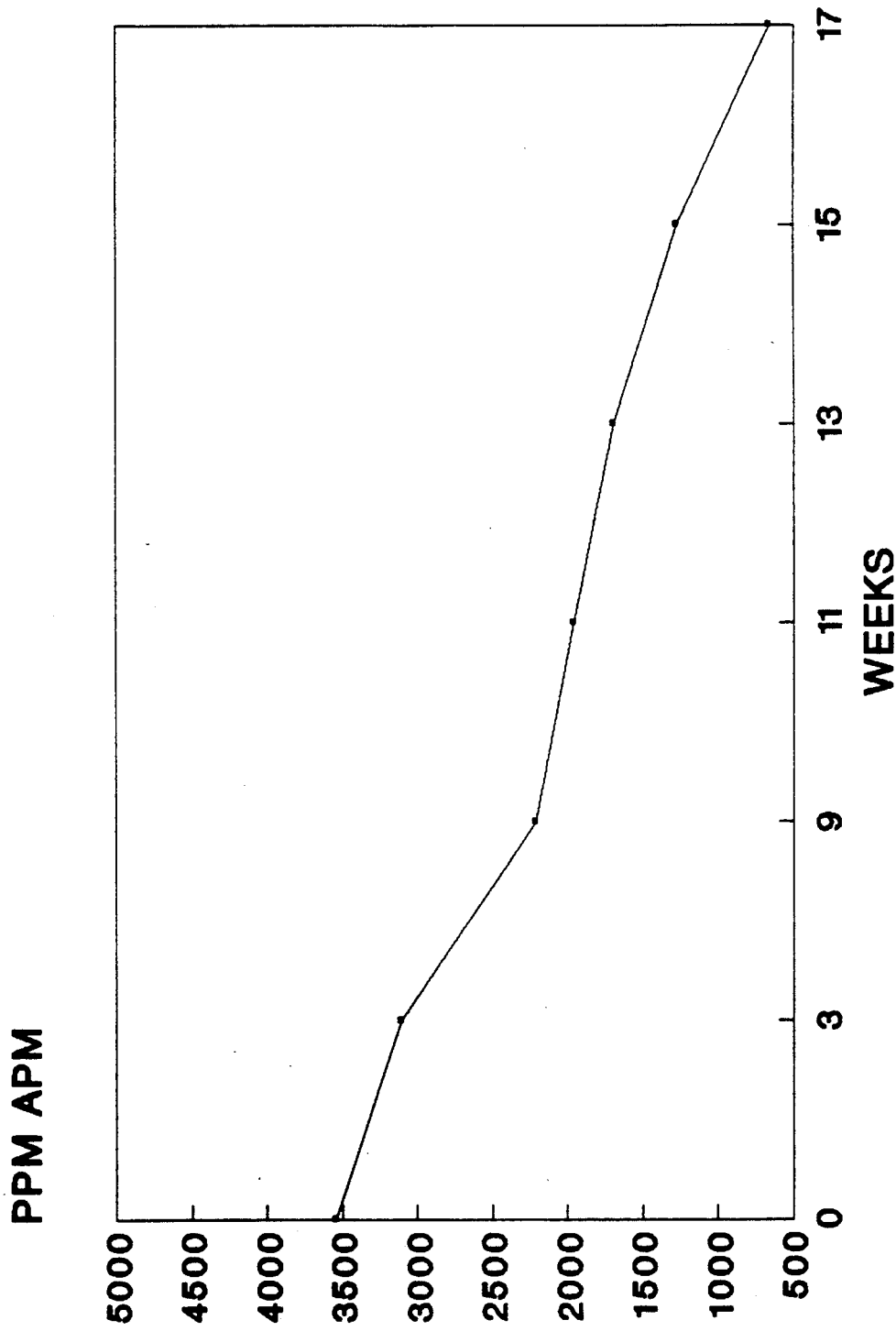
FIG. 10 is a graph of parts per million of aspartame vs. time for the slab product of Example 17 undergoing accelerated aging.

The test results at room temperature are graphically depicted in FIG. 9 and the test results at 105° F. are graphically depicted in FIG. 10.

(b) The stick shaped gum was tested for stability of the aspartame with the following results:

| | Aspartame Content | | | |
|---|---|---|---|---|
| | Room Temperature | | 105° F. | |
| Week | PPM | Percent of Initial Amount | PPM | Percent of Initial Amount |
| 0 | 3526 | 100 | 3526 | 100 |
| 3 | — | — | 2911 | 82.56 |
| 7 | — | — | 2244 | 63.07 |
| 9 | — | — | 1979 | 56.13 |
| 11 | — | — | 1786 | 50.65 |
| 12 | 2996 | 85.0 | — | — |
| 13 | — | — | 1405 | 39.85 |
| 15 | — | — | 1135 | 32.19 |
| 17 | 2975 | 84.37 | — | — |
| 22 | 2913 | 82.62 | — | — |
| 27 | 2975 | 84.37 | — | — |
| 31 | 2639 | 74.84 | — | — |

Figure 11:
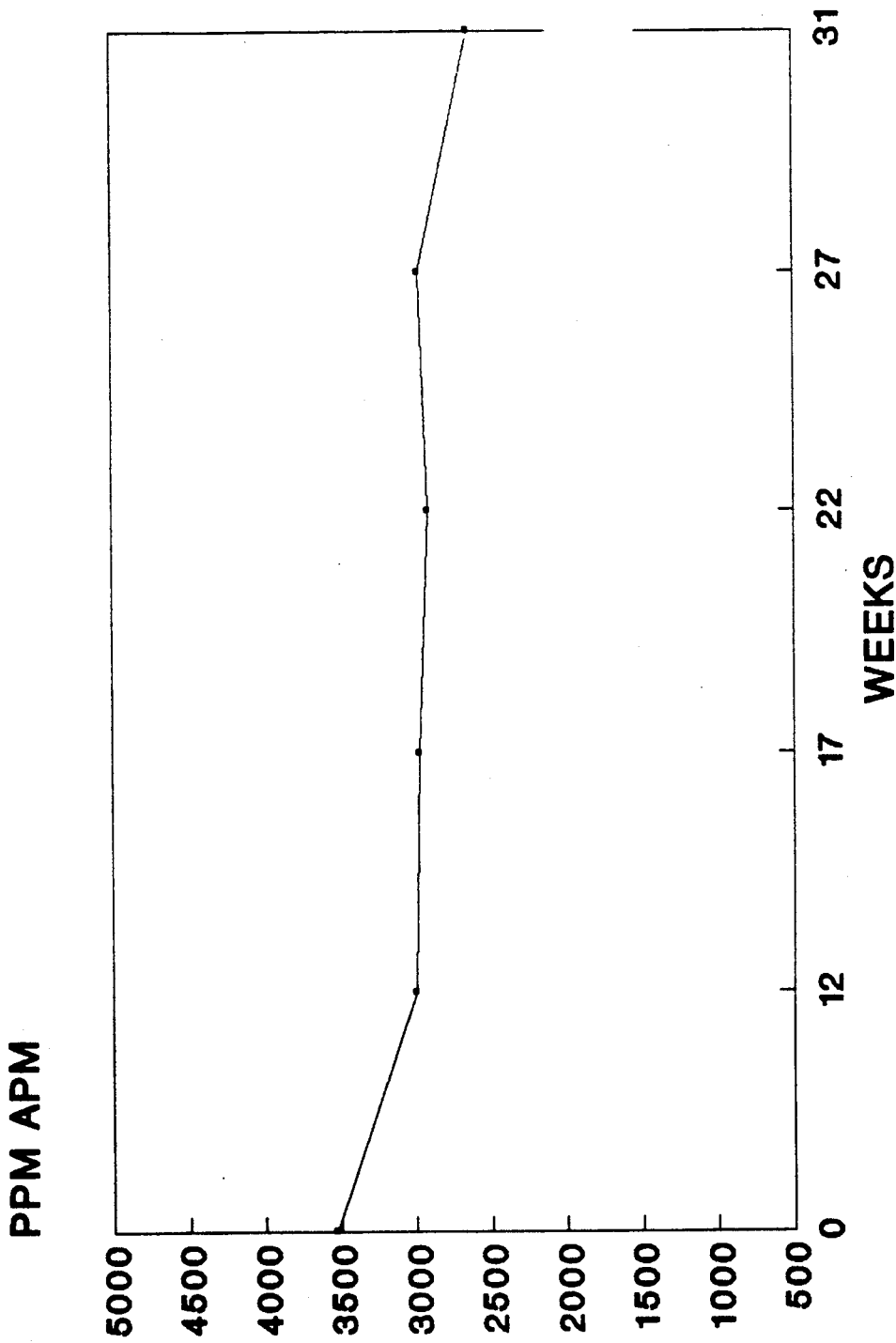
FIG. 11 is a graph of parts per million of aspartame vs. time for the stick product of Example 17 at room temperature.
Figure 12:
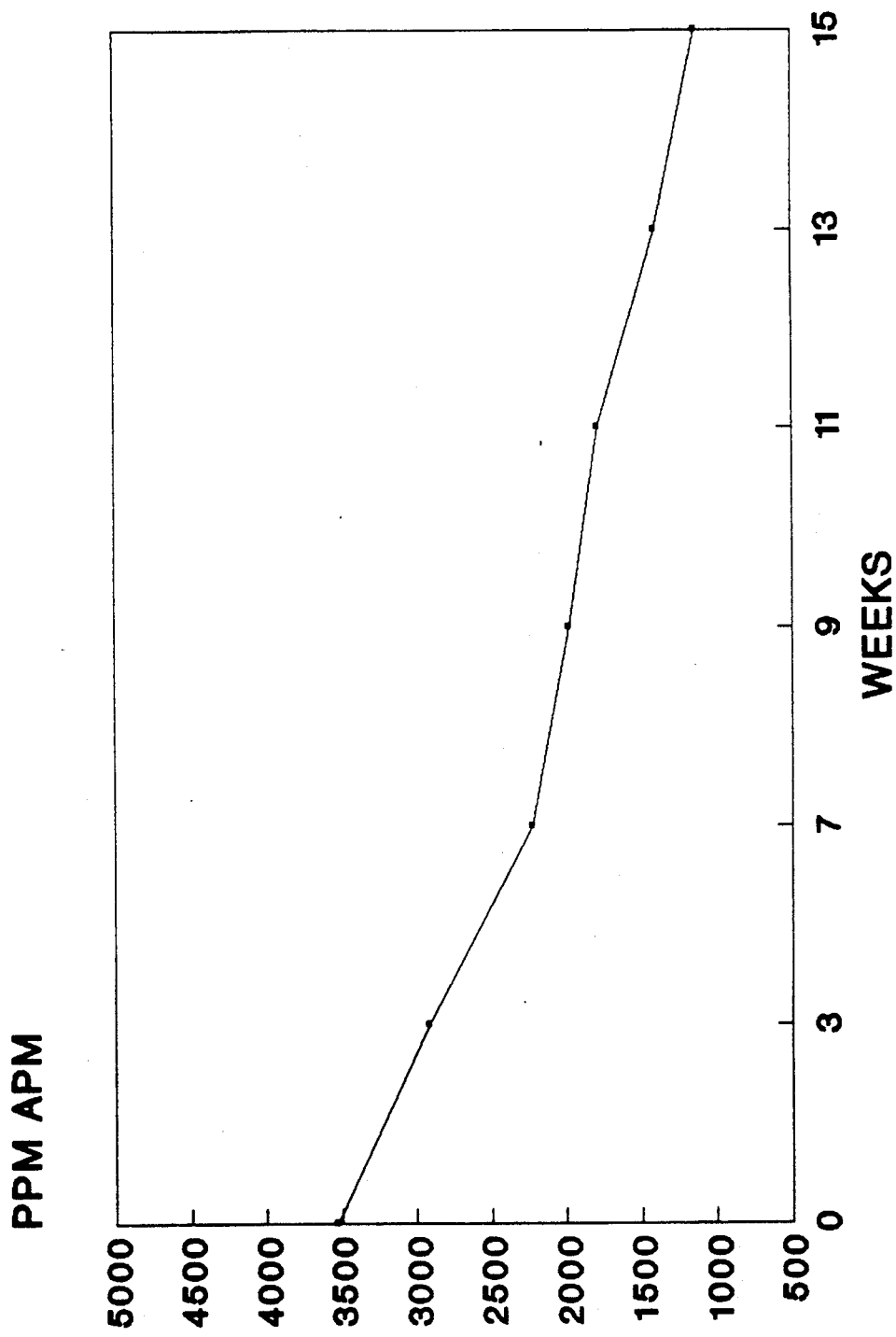
FIG. 12 is a graph of parts per million of aspartame vs. time for the stick product of Example 17 undergoing accelerated aging.

The test results at room temperature are graphically depicted in FIG. 11 and the test results at 105° F. are graphically depicted in FIG. 12.

EXAMPLE 18

Preparation of Slab and Stick Gum

The procedure of Example 17 was repeated with the exception that xylitol was substituted for sorbitol.

(a) The slab shaped gum was tested for stability of the aspartame with the following results:

| | Aspartame Content | | | |
|---|---|---|---|---|
| | Room Temperature | | 105° F. | |
| Week | PPM | Percent of Initial Amount | PPM | Percent of Initial Amount |
| 0 | 3351 | 100 | 3351 | 100 |
| 3 | — | — | 3207 | 95.70 |
| 10 | — | — | 2458 | 73.35 |
| 11 | — | — | 2136 | 63.74 |
| 12 | 3140 | 93.70 | — | — |
| 13 | — | — | 2097 | 62.58 |
| 15 | — | — | 1445 | 43.12 |
| 17 | 3113 | 92.90 | 1479 | 44.14 |
| 22 | 2903 | 86.63 | — | — |
| 27 | 2930 | 87.44 | — | — |
| 31 | 2892 | 86.30 | — | — |

Figure 13:
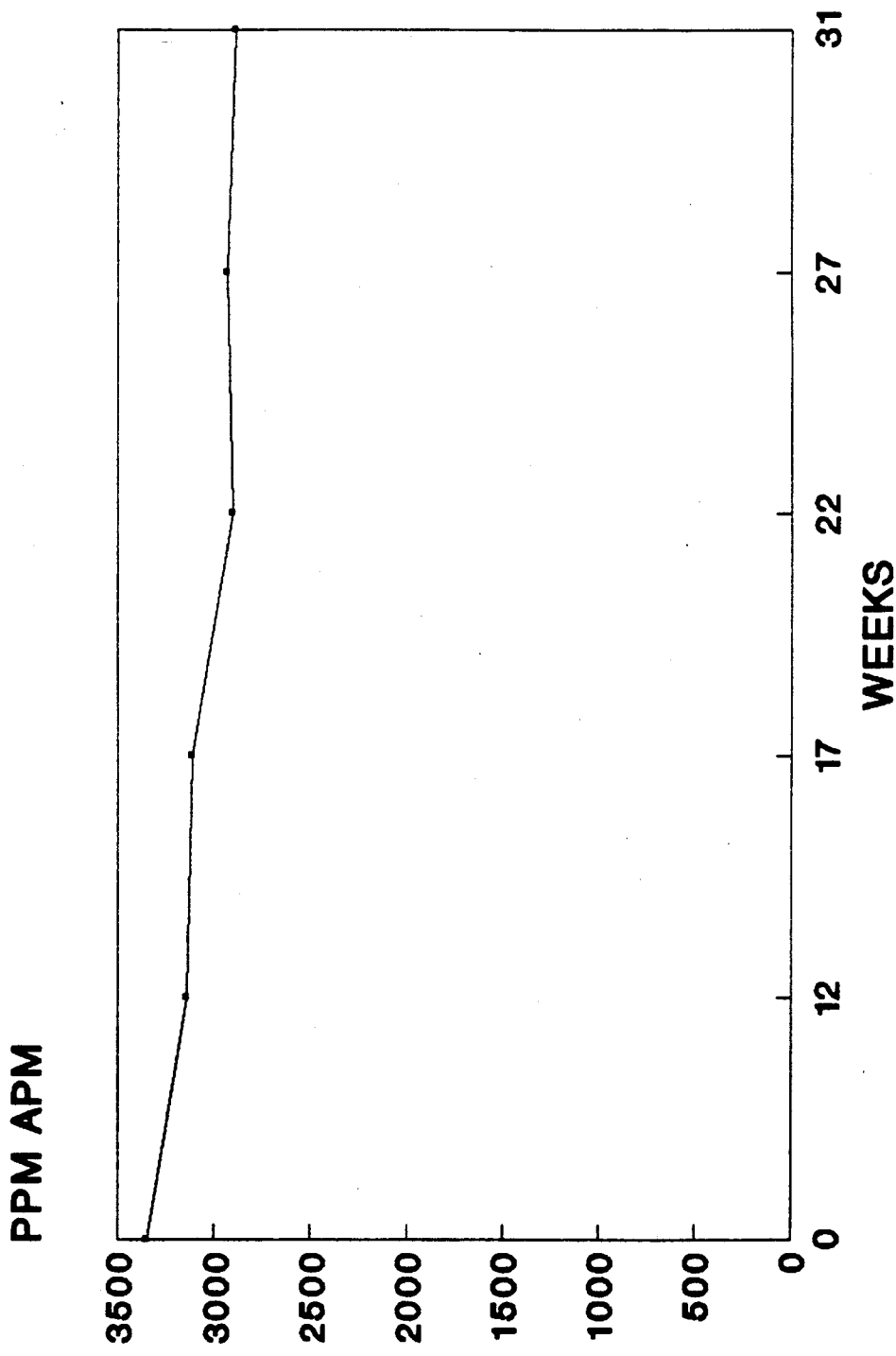
FIG. 13 is a graph of parts per million of aspartame vs. time for the slab product of Example 18 at room temperature.
Figure 14:
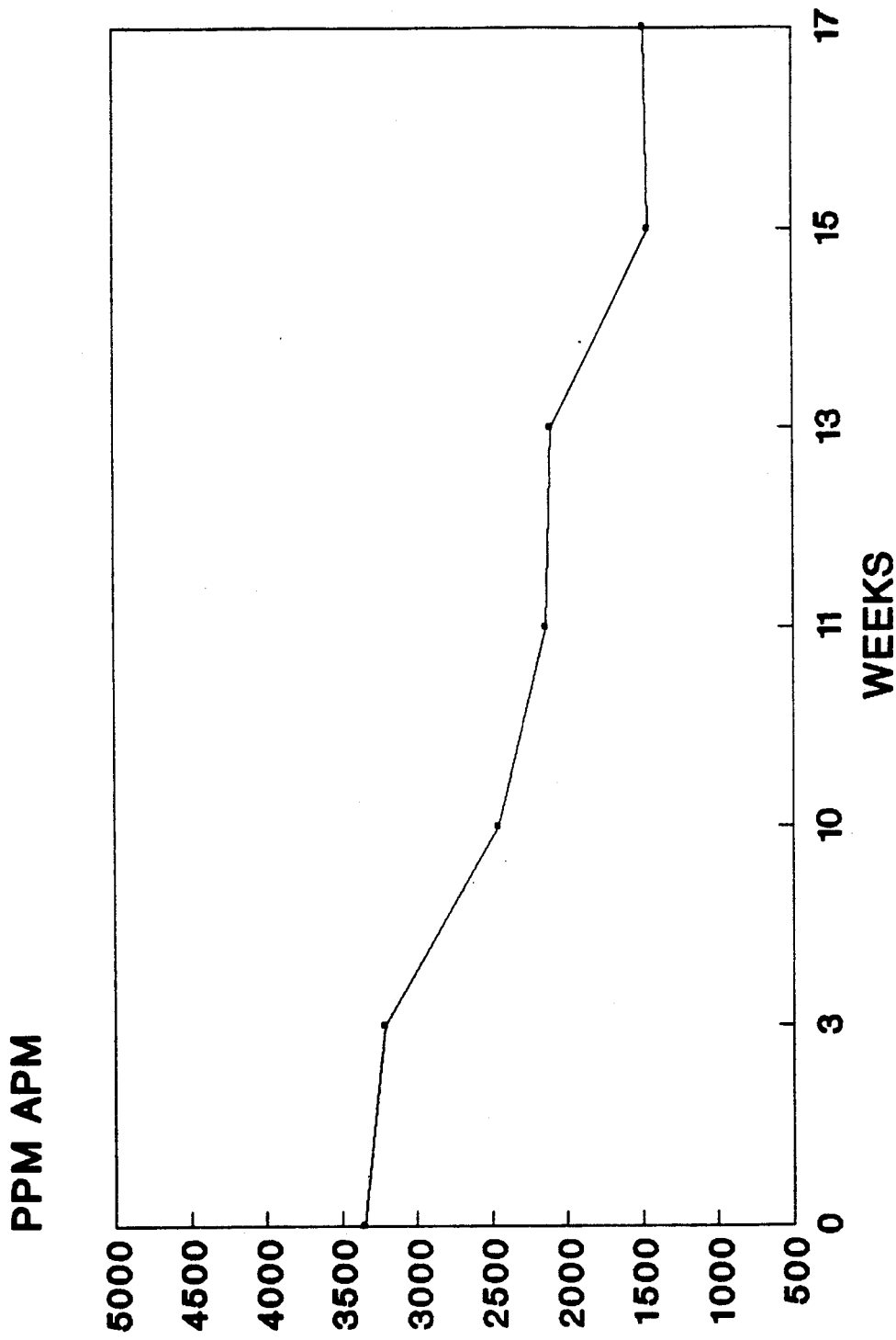
FIG. 14 is a graph of parts per million of aspartame vs. time for the slab product of Example 18 undergoing accelerated aging.

The test results at room temperature are graphically depicted in FIG. 13 and the test results at 105° F. are graphically depicted in FIG. 14.

(b) The stick gum was tested for stability of the aspartame with the following results:

| | Aspartame Content | | | |
|---|---|---|---|---|
| | Room Temperature | | 105° F. | |
| Week | PPM | Percent of Initial Amount | PPM | Percent of Initial Amount |
| 0 | 3356 | 100 | 3356 | 100 |
| 3 | — | — | 3233 | 96.34 |
| 10 | — | — | 2513 | 74.88 |
| 11 | — | — | 2173 | 64.75 |
| 13 | — | — | 2084 | 62.10 |
| 15 | 3099 | 92.34 | 1354 | 40.35 |
| 17 | — | — | 1512 | 45.05 |
| 19 | 2973 | 88.89 | — | — |
| 24 | 2956 | 88.08 | — | — |
| 29 | 2863 | 85.31 | — | — |
| 34 | 2727 | 81.26 | — | — |

Figure 15:
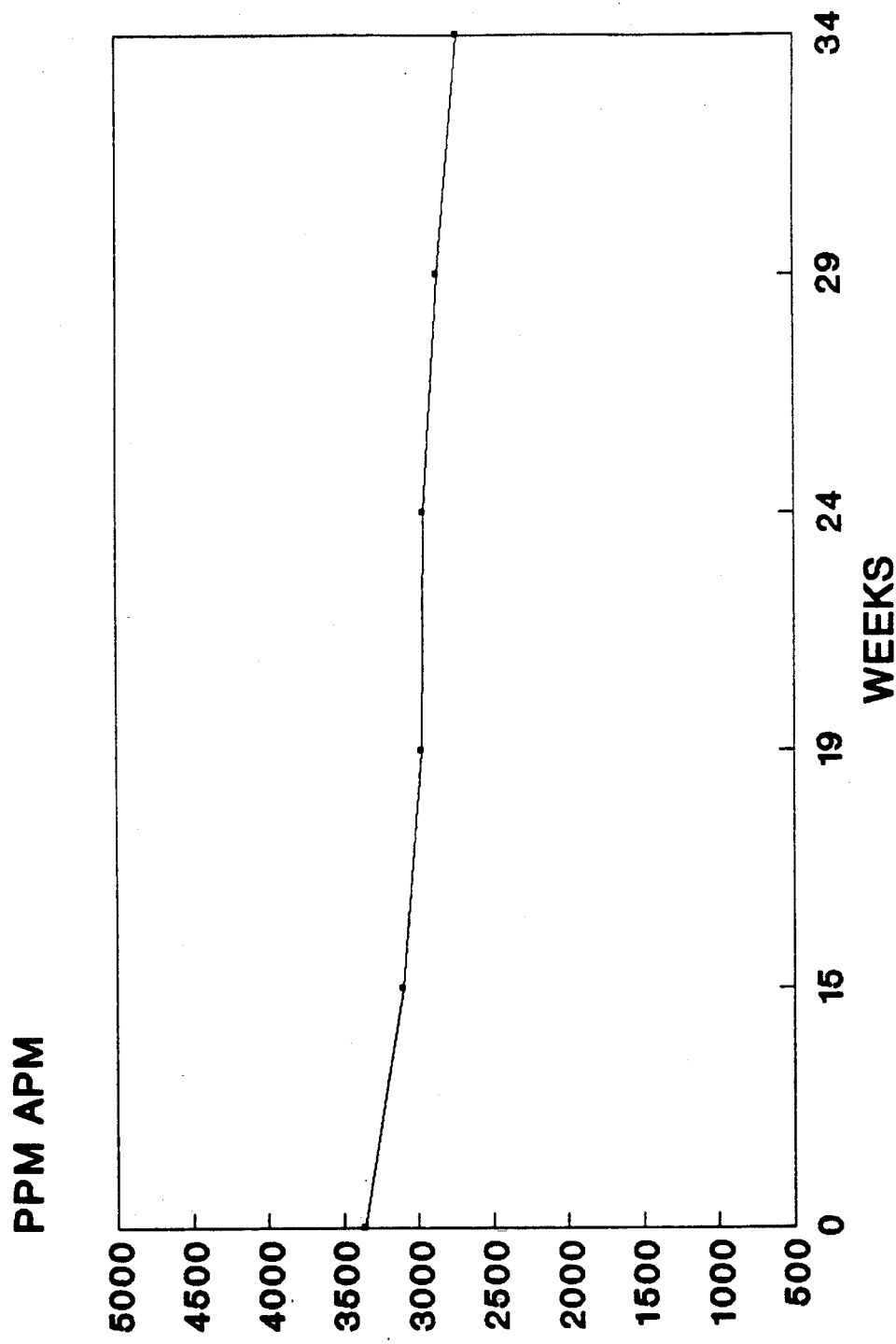
FIG. 15 is a graph of parts per million of aspartame vs. time for the stick-product of Example 18 at room temperature.
Figure 16:
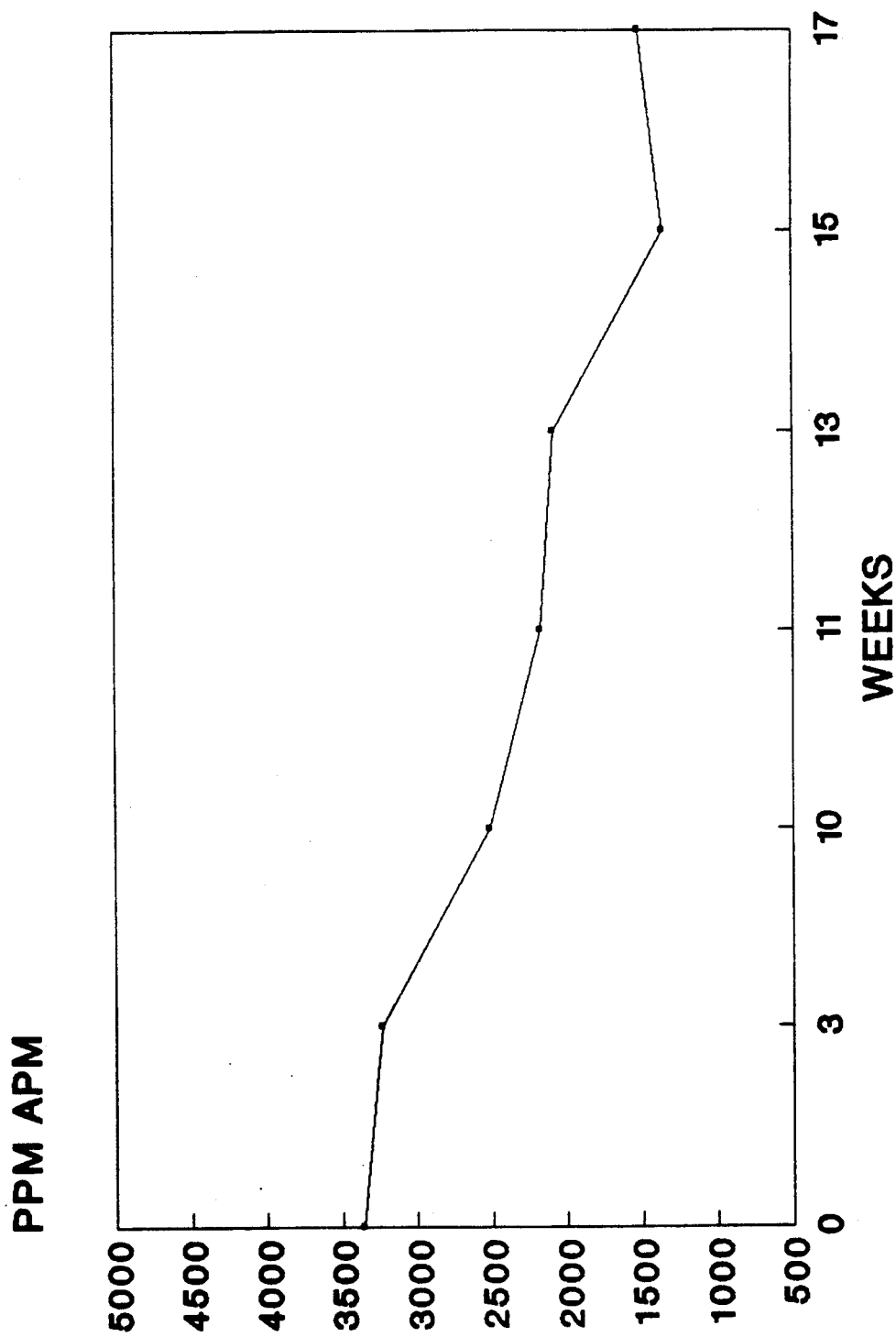
FIG. 16 is a graph of parts per million of aspartame vs. time for the stick product of Example 18 undergoing accelerated aging.

The test results at room temperature are graphically depicted in FIG. 15 and the test results at 105° F. are graphically depicted in FIG. 16.

Another embodiment of the present invention includes compositions containing hydrogenated starch hydrolysate. The hydrogenated starch hydrolysate can be from about 0.2 to about 15 weight percent of the chewing gum composition.

Commercially available hydrogenated starch hydrolysate is also referred to a hydrogenated glucose syrup. It is sold under the trademark Lycasin as an aqueous solution having a moisture content of about 20 to 35 weight percent. The present invention permits this material to be used without precooking to lower its moisture content which precooking is sometimes required in other applications including other chewing gum applications using aspartame.

Examples 19 and 20 show gum compositions of the present invention containing hydrogenated starch hydrolysate and the aspartame content at time intervals with product maintained at room temperature and at 105° F.

EXAMPLE 19

Preparation of Gum Containing Hydrogenated Starch Hydrolysate

A paste containing uncooked hydrogenated starch hydrolysate (176.2 grams) and xylitol (176.2 grams) were placed in a kettle. Gum base (416 grams), calcium carbonate (104 grams) and lecithin (10 grams) were added to the contents of the kettle and mixed for 2 minutes. Xylitol (512.3 grams) was then added to the mixture which was stirred for 3 minutes. The matrix of Example 7 (69.0 grams) was then added and mixed for 3 minute. Additional xylitol (512.3 grams) and flavor (24 grams) were added and the mixture stirred for 4 minutes. Then 30 sticks of gum were formed from the product, 15 were kept at room temperature and 15 were maintained at 105° F. Analyses of the aspartame content were made at time intervals, as follows:

| | Aspartame Content | | | |
|---|---|---|---|---|
| | Room Temperature | | 105° F. | |
| Week | PPM | Percent of Initial Amount | PPM | Percent of Initial Amount |
| 0 | 2740 | 100 | 2740 | 100 |
| 2 | — | — | 2185 | 79.74 |
| 4 | — | — | 1993 | 72.74 |
| 6 | 2520 | 91.97 | 1799 | 65.66 |
| 8 | — | — | 1713 | 62.52 |
| 11 | — | — | 1432 | 52.26 |
| 12 | 2327 | 84.93 | — | — |
| 14 | — | — | 1229 | 44.85 |
| 17 | 2301 | 83.98 | — | — |

Figure 17:
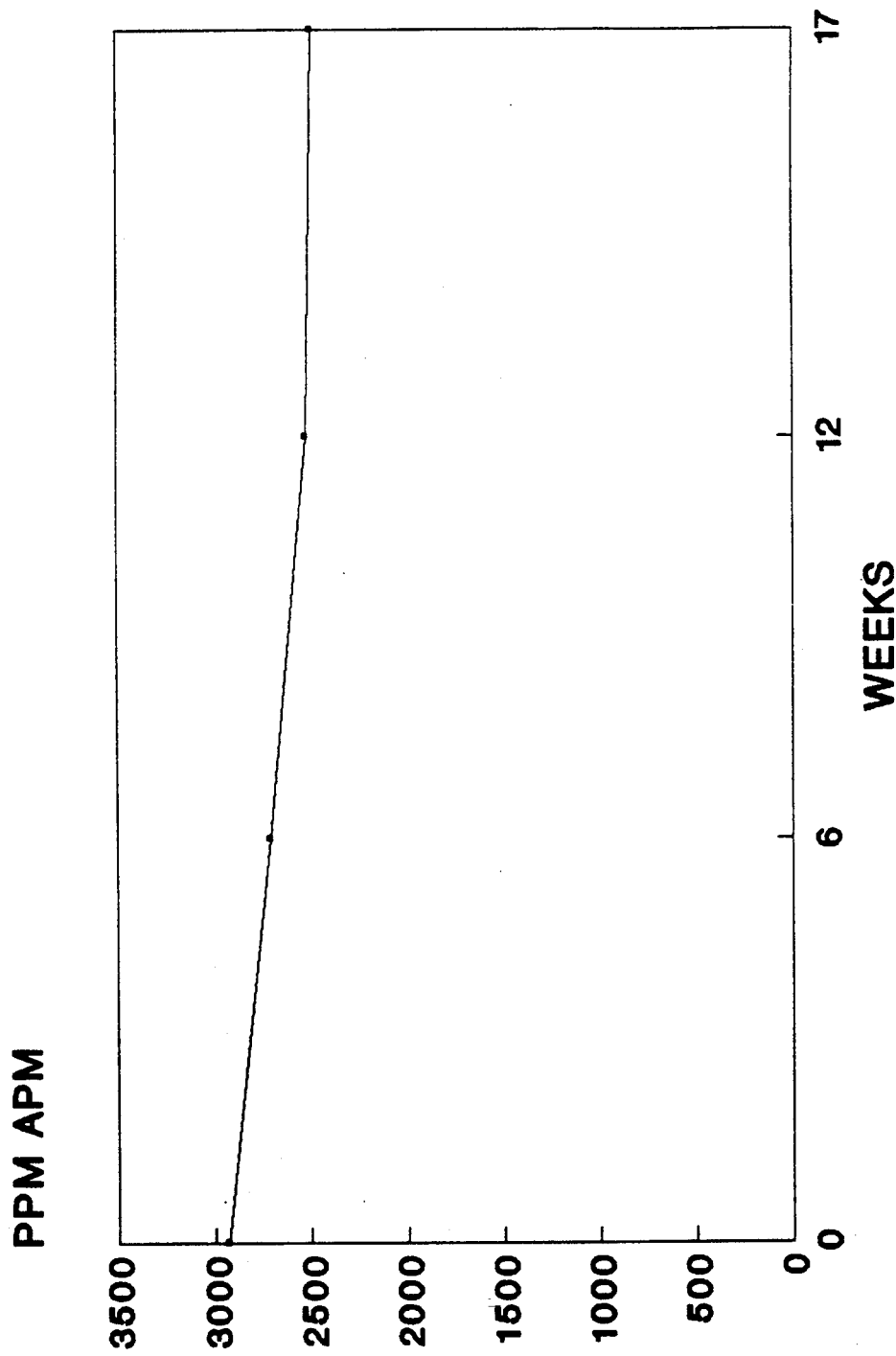
FIG. 17 is a graph of parts per million of aspartame vs. time for the product of Example 19 at room temperature.
Figure 18:
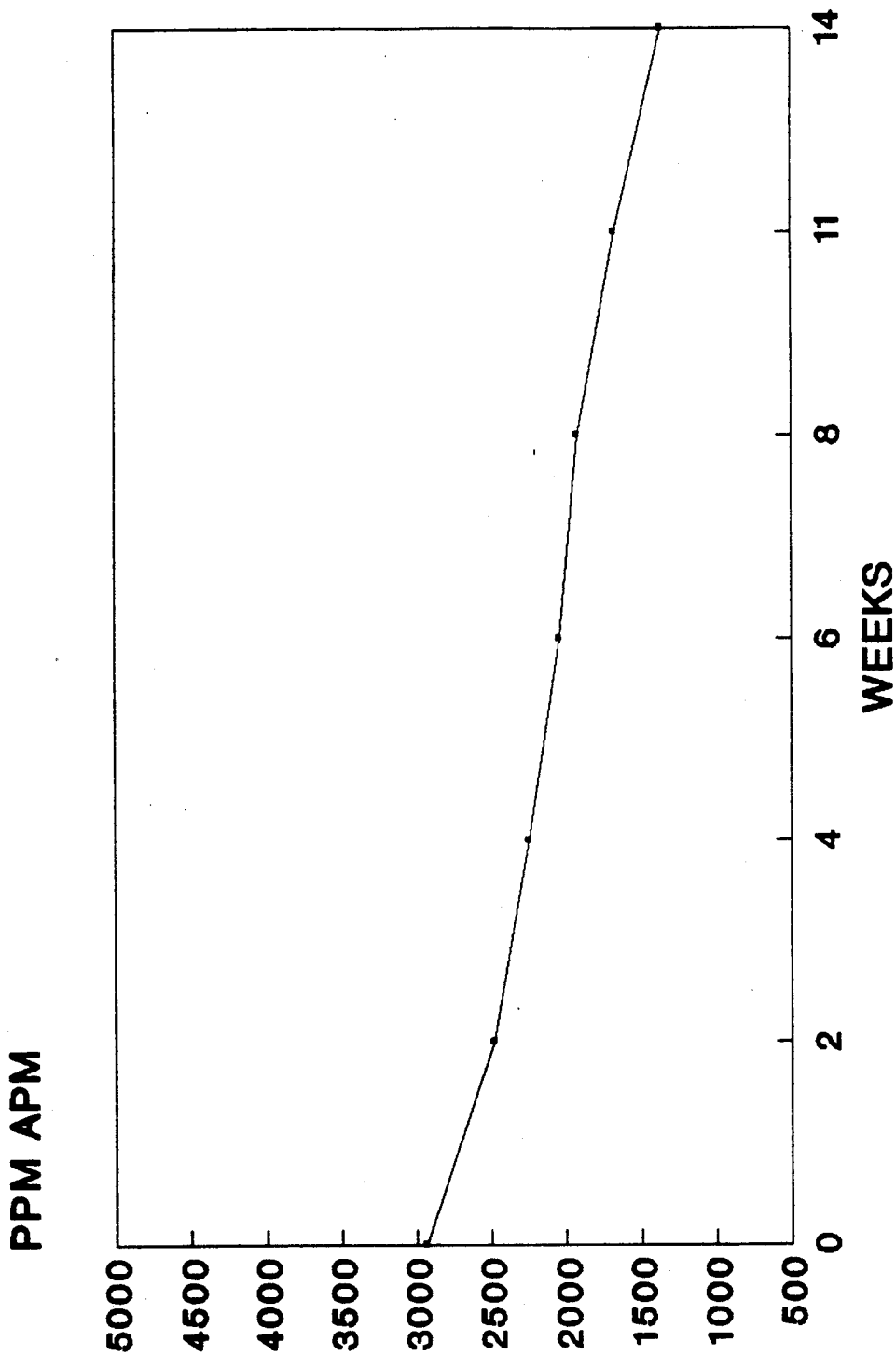
FIG. 18 is a graph of parts per million of aspartame vs. time for the product of Example 19 undergoing accelerated aging.

The test results at room temperature are graphically depicted in FIG. 17 and the test results at 105° F. are graphically depicted in FIG. 18.

EXAMPLE 20

Preparation of Gum Containing Hydrogenated Starch Hydrolysate

A paste containing uncooked hydrogenated starch hydrolysate (176.2 grams) and xylitol (176.2 grams) was placed into a kettle. Gum base (416 grams), calcium carbonate (104 grams) and lecithin (352.4 grams) were added to the kettle and the mixture was stirred for 2 minutes. Xylitol (512.3 grams) was added to the contents of the kettle and mixed for 3 minutes. The matrix of Example 11 (69 rams) was then added and mixed -or 3 minutes. Additional xylitol (512.3 grams) and flavor were then added and the product mixed for 4 minutes The product was formed into 30 sticks of gum. 15 sticks of gum were kept at room temperature and 15 were maintained at 105° F. Analyses of the aspartame content were made over time, as follows:

| | Aspartame Content | | | |
|---|---|---|---|---|
| | Room Temperature | | 105° F. | |
| Week | PPM | Percent of Initial Amount | PPM | Percent of Initial Amount |
| 0 | 2934 | 100 | 2934 | 100 |
| 2 | — | — | 2478 | 74.23 |
| 4 | — | — | 2245 | 76.52 |
| 6 | 2708 | 92.3 | 2040 | 69.53 |
| 8 | — | — | 1921 | 65.47 |
| 11 | — | — | 1672 | 56.99 |
| 12 | 2519 | 85.86 | — | — |
| 14 | — | — | 1361 | 46.39 |

-continued

| | Aspartame Content | | | |
|---|---|---|---|---|
| | Room Temperature | | 105° F. | |
| Week | PPM | Percent of Initial Amount | PPM | Percent of Initial Amount |
| 17 | 2492 | 84.94 | — | — |

Figure 19:
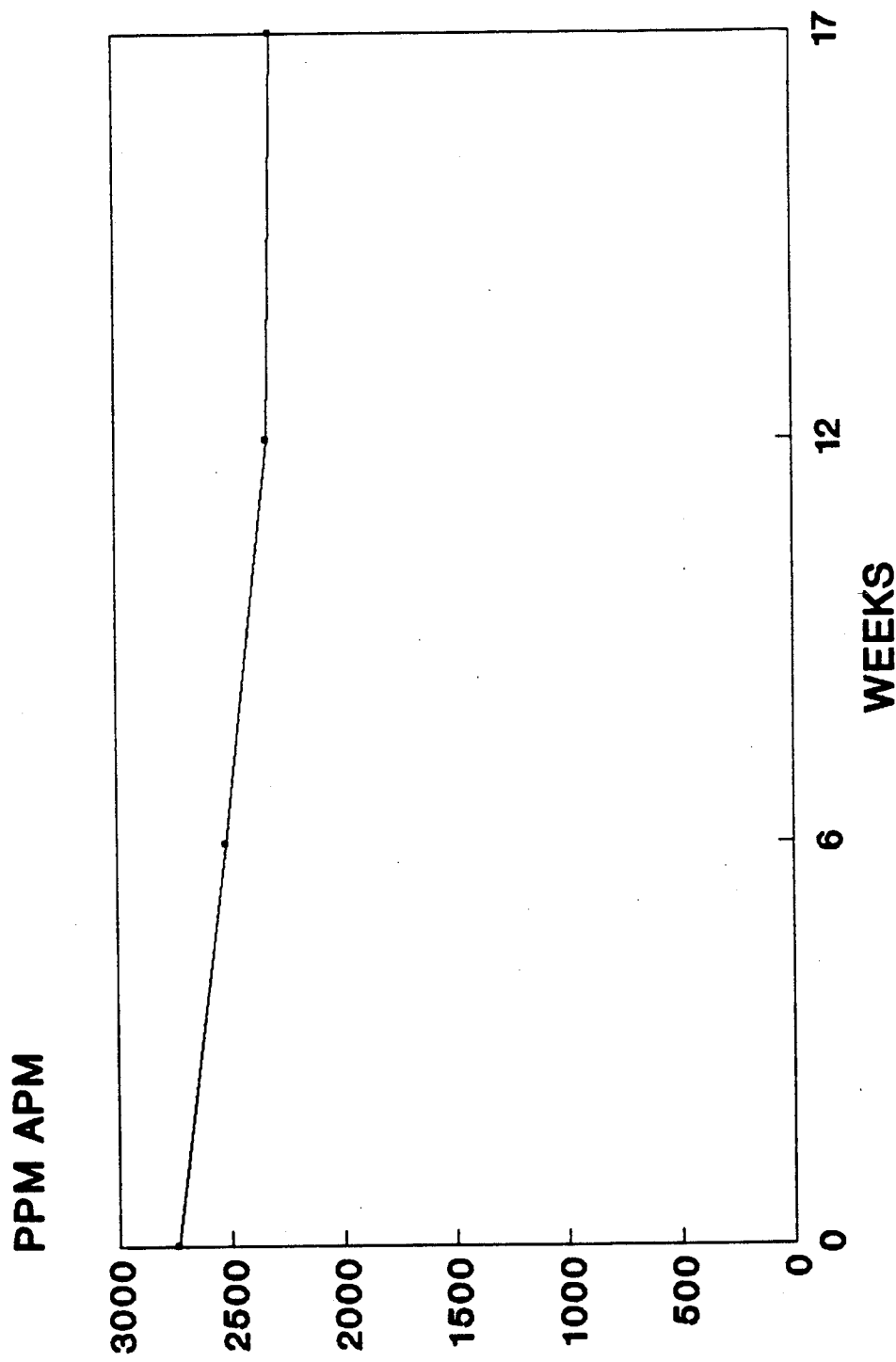
FIG. 19 is a graph of parts per million of aspartame vs. time for the product of Example 20 at room temperature.
Figure 20:
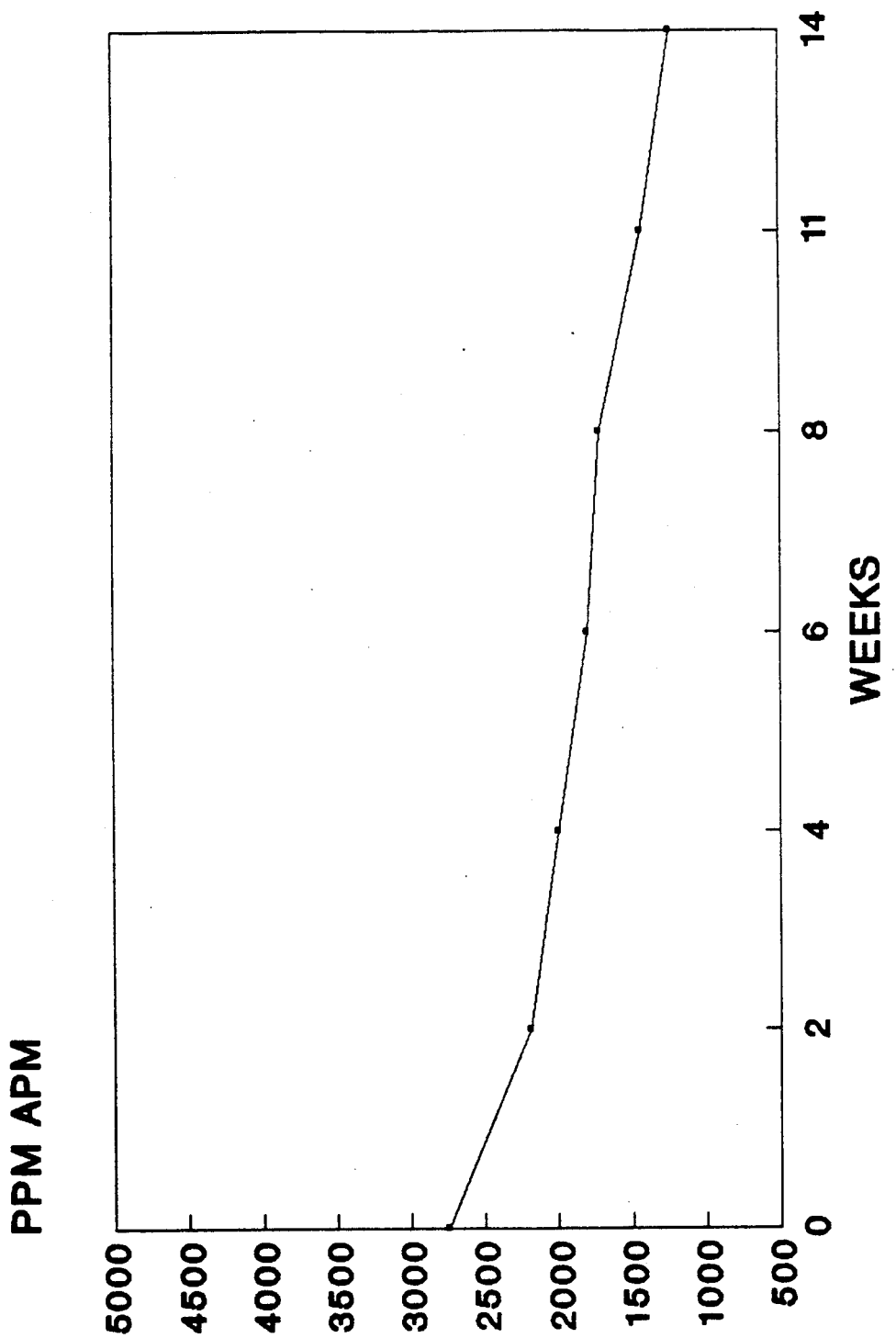
FIG. 20 is a graph of parts per million of aspartame vs. time for the product of Example 20 undergoing accelerated aging.

The test results at room temperature are graphically depicted in FIG. 19 and the test results at 105° F. are graphically depicted in FIG. 20.

Example 21 shows the preparation of chewing gum by the direct addition of aspartame and glycerin and without the formation of a marix and without the addition of Avicel or a hygroscopic metallic salt. The aspartame content of the gum at intervals of time during its life were determined.

EXAMPLE 21

Lecithin (10.0 grams) were added to warm gum base (520.0 grams) contained in a kettle and mixed for 2 minutes. Xylitol (639.7 grams and aspartame (6.6 grams) were added to the mixture which was mixed for an additional 3 minutes. Glycerin (160.0 grams) was then added to the mixture which was then mixed for an additional 3 minutes. Xylitol (639.7 grams) and peppermint flavor (24.0 grams) were then added to the mixture with 4 minutes of additional mixing. 300 sticks of chewing gum were made from the mixture with 150 sticks maintained at room temperature and 150 sticks maintained at 105° F. for accelerated testing. The sticks of gum were intervallicly analyzed for aspartame content with the following results:

| | ROOM TEMPERATURE | | 105° F. | |
|---|---|---|---|---|
| WEEK | PPM | % OF INITIAL AMOUNT | PPM | % OF INITIAL AMOUNT |
| 0 | 2189.00 | 100.00 | 2189.00 | 100.00 |
| 2 | — | — | 1448.00 | 66.15 |
| 4 | — | — | 1157.00 | 52.86 |
| 5 | 1560.00 | 71.27 | — | — |
| 6 | — | — | 1006.00 | 45.96 |
| 10 | 1473.00 | 67.29 | — | — |
| 13 | — | — | 226.00 | 10.30 |
| 14 | 552.00 | 25.22 | — | — |

Figure 21:
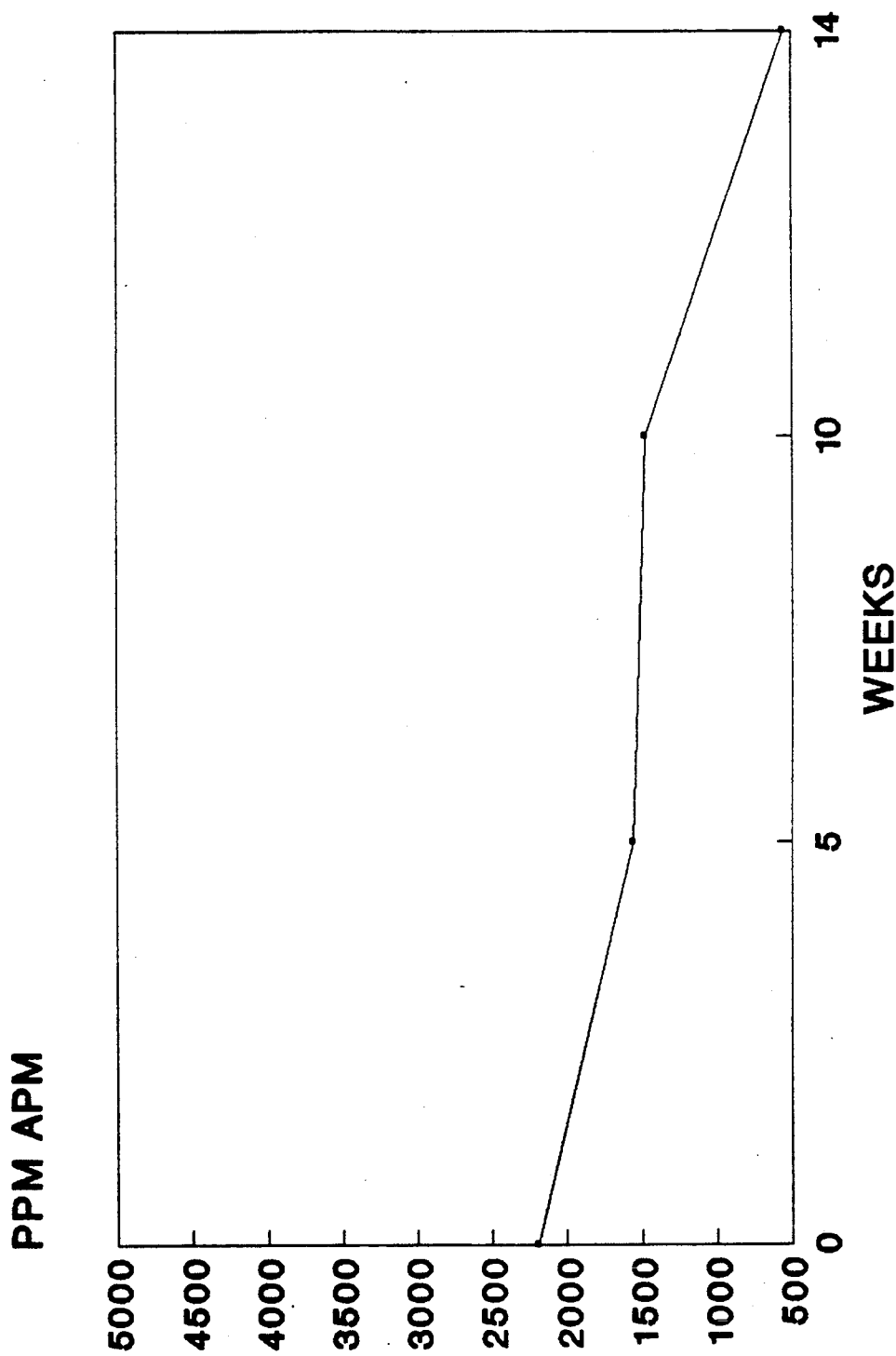
FIG. 21 is a graph of parts per million of aspartame vs. time for the product of Example 21 at room temperature.
Figure 22:
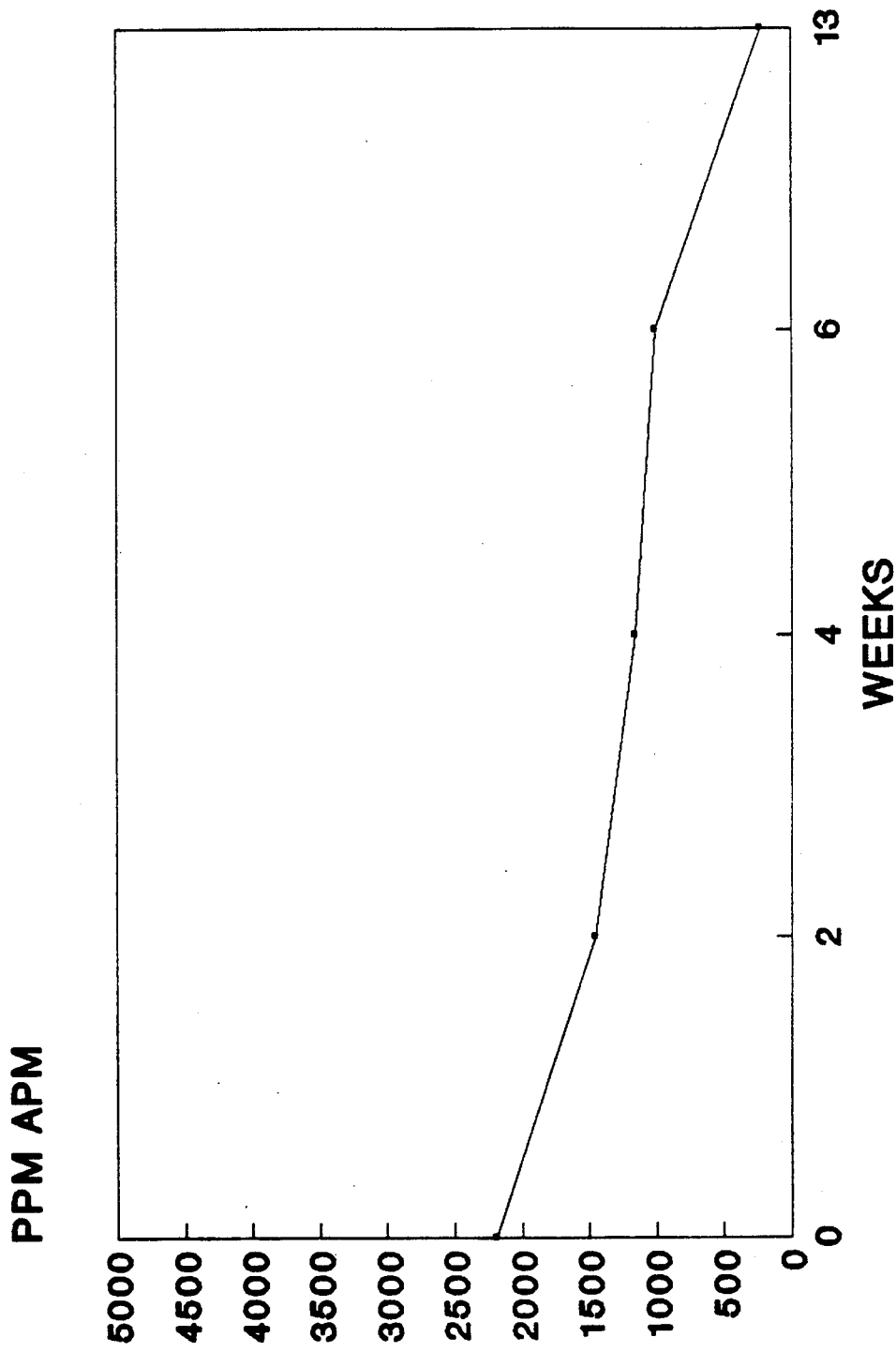
FIG. 22 is a graph of parts per million of aspartame vs. time for the product of Example 21 undergoing accelerated aging.

The test results at room temperature are graphically depicted in FIG. 21 and the test results at 105° F. are graphically depicted in FIG. 22.

Examples 22–41 further demonstrate the effectiveness of the present invention. Examples 22–25 were prepared by direct addition of their respective ingredients to the gum composition, i.e. the aspartame, glycerin, aluminum sulfate and/or Avicel were not delivered in matrix form. Example 22 was prepared with the direct addition of aspartame and glycerin; Example 23 was prepared with the direct addition of aspartame, aluminum sulfate and glycerin; Example 24 was prepared with the direct addition of aspartame, Avicel and glycerin; Example 25 was prepared with the direct addition of aspartame, aluminum sulfate, Avicel and glycerine. Examples 26–41 were prepared by adding aspartame, glycerin, and/or a hygroscopic metal salt for silica), and/or Avicel (or gum arabic) in matrix form to the gum composition. Each example used the same peppermint flavor and each example included a gum base which comprised 25 weight percent calcium carbonate (i.e. the amount of calcium carbonate equals the total weight specified for the gum base time 20%).

When Avicel was included in the composition, it was Avicel RC-941F.

The general procedure for the preparation of the gum compositions was adding the lecithin to melted gum base in a warm kettle and mixing the combination for 2 minutes. Then one-half of the total amount of the pulverized xylitol was added to the mixture in the kettle and mixed for 3 minutes. Glycerin was then added with 3 minutes of mixing. In Examples 22–25, the aspartame and other direct additives (i.e. aluminum sulfate and/or Avicel) were added with the first half of the xylitol. In Examples 26–41, the matrix was added to the kettle, and the combination was mixed for 3 minutes. Then the remaining one-half of the pulverized xylitol and the flavoring were added to the mixture followed by 4 minutes of stirring. Then the gum compositions were formed into 200 sticks of gum, 100 sticks were maintained at room temperature and 100 sticks were maintained at 105° F. for subsequent analysis.

The compositions of the chewing gums of Examples 22–41 were as follows:

EXAMPLE 22

| | WEIGHT (grams) | PERCENT |
|---|---|---|
| Gum Base | 520.0 | 26.00 |
| Aspartame | 6.6 | 0.33 |
| Glycerin | 160.0 | 8.00 |
| Xylitol | 1279.4 | 63.97 |
| Flavor | 24.0 | 1.20 |
| Lecithin | 10.0 | 0.50 |

EXAMPLE 23

| | WEIGHT (grams) | PERCENT |
|---|---|---|
| Gum Base | 520.0 | 26.00 |
| Aspartame | 6.6 | 0.33 |
| Aluminum Sulfate | 0.4 | 0.02 |
| Glycerin | 160.0 | 8.00 |
| Xylitol | 1279.4 | 63.95 |
| Flavor | 24.0 | 1.20 |
| Lecithin | 10.0 | 0.50 |

EXAMPLE 24

| | WEIGHT (grams) | PERCENT |
|---|---|---|
| Gum Base | 520.0 | 26.00 |
| Aspartame | 6.6 | 0.33 |
| Avicel | 16.0 | 0.80 |
| Glycerin | 160.0 | 8.00 |
| Xylitol | 1263.4 | 63.17 |
| Flavor | 24.0 | 1.20 |
| Lecithin | 10.0 | 0.50 |

EXAMPLE 25

| | WEIGHT (grams) | PERCENT |
|---|---|---|
| Gum Base | 520.0 | 26.00 |
| Aspartame | 6.6 | 0.33 |
| Avicel | 16.0 | 0.80 |
| Aluminum Sulfate | 0.4 | 0.02 |
| Glycerin | 160.0 | 8.00 |
| Xylitol | 1263.4 | 63.15 |
| Flavor | 24.0 | 1.20 |
| Lecithin | 10.0 | 0.50 |

EXAMPLES 26-41 (General Formulation)

|  | WEIGHT (grams) | PERCENT |
|---|---|---|
| Gum Base | 520.0 | 26.00 |
| Xylitol | 1263.0 | 63.15 |
| Flavor | 24.0 | 1.20 |
| Lecithin | 10.0 | 0.50 |
| Matrix | 183.0 | 9.15 |

The matrices used in Examples 26-41 were in general prepared by adding the hygroscopic compound and/or the Avicel to glycerin in a Hobart bowl and mixing slowly at speed #1 until it was completely mixed in. Then the aspartame was added and mixed at speed #1 until it was totally incorporated. The composition was then mixed at speed #2 for 5 minutes and then mixed at speed #3 for an additional 5 minutes.

The respective composition of the matrices used for Examples 26-41 were as follows:

EXAMPLE 26

| MATRIX COMPRISED OF: | WEIGHT (grams) | PERCENT |
|---|---|---|
| Glycerin | 1928 | 96.39 |
| Aspartame | 72 | 3.61 |

EXAMPLE 27

| MATRIX COMPRISED OF: | WEIGHT (grams) | PERCENT |
|---|---|---|
| Glycerin | 1754 | 87.69 |
| Gum Arabic | 174 | 8.70 |
| Aspartame | 72 | 3.61 |

EXAMPLE 28

| MATRIX COMPRISED OF: | WEIGHT (grams) | PERCENT |
|---|---|---|
| Glycerin | 1749 | 87.44 |
| Gum Arabic | 174 | 8.70 |
| Aluminum Sulfate | 5 | 0.25 |
| Aspartame | 72 | 3.61 |

EXAMPLE 29

| MATRIX COMPRISED OF: | WEIGHT (grams) | PERCENT |
|---|---|---|
| Glycerin | 1748 | 87.44 |
| Avicel | 174 | 8.70 |
| Aluminum Sulfate | 5 | 0.25 |
| Aspartame | 72 | 3.61 |

EXAMPLE 30

| MATRIX COMPRISED OF: | WEIGHT (grams) | PERCENT |
|---|---|---|
| Glycerin | 1924.39 | 96.22 |
| Silica Dioxide Gel | 3.61 | 0.18 |
| Aspartame | 72.00 | 3.60 |

EXAMPLE 31

| MATRIX COMPRISED OF: | WEIGHT (grams) | PERCENT |
|---|---|---|
| Glycerin | 1750.40 | 87.52 |
| Silica Dioxide Gel | 3.61 | 0.18 |
| Aspartame | 72.00 | 3.60 |
| Avicel | 174.00 | 8.70 |

EXAMPLE 32

| MATRIX COMPRISED OF: | WEIGHT (grams) | PERCENT |
|---|---|---|
| Glycerin | 1923.56 | 96.18 |
| Calcium Chloride | 4.44 | 0.22 |
| Aspartame | 72.00 | 3.60 |

EXAMPLE 33

| MATRIX COMPRISED OF: | WEIGHT (grams) | PERCENT |
|---|---|---|
| Glycerin | 1749.56 | 87.48 |
| Calcium Chloride | 4.44 | 0.22 |
| Aspartame | 72.00 | 3.60 |
| Avicel | 174.00 | 8.70 |

EXAMPLE 34

| MATRIX COMPRISED OF: | WEIGHT (grams) | PERCENT |
|---|---|---|
| Glycerin | 1919.23 | 95.96 |
| Zinc Chloride | 8.77 | 0.44 |
| Aspartame | 72.00 | 3.60 |

EXAMPLE 35

| MATRIX COMPRISED OF: | WEIGHT (grams) | PERCENT |
|---|---|---|
| Glycerin | 1745.23 | 87.26 |
| Zinc Chloride | 8.77 | 0.44 |
| Aspartame | 72.00 | 3.60 |
| Avicel | 174.00 | 8.70 |

EXAMPLE 36

| MATRIX COMPRISED OF: | WEIGHT (grams) | PERCENT |
|---|---|---|
| Glycerin | 1922.17 | 96.11 |
| Ferrous Sulfate | 5.83 | 0.29 |
| Aspartame | 72.00 | 3.60 |

EXAMPLE 37

| MATRIX COMPRISED OF: | WEIGHT (grams) | PERCENT |
|---|---|---|
| Glycerin | 1748.17 | 87.41 |
| Ferrous Sulfate | 5.83 | 0.29 |
| Aspartame | 72.00 | 3.60 |
| Avicel | 174.00 | 8.70 |

EXAMPLE 38

| MATRIX COMPRISED OF: | WEIGHT (grams) | PERCENT |
|---|---|---|
| Glycerin | 1922.67 | 96.13 |

-continued

| MATRIX COMPRISED OF: | WEIGHT (grams) | PERCENT |
|---|---|---|
| Aluminum Chloride | 5.33 | 0.27 |
| Aspartame | 72.00 | 3.60 |

EXAMPLE 39

| MATRIX COMPRISED OF: | WEIGHT (grams) | PERCENT |
|---|---|---|
| Glycerin | 1748.67 | 87.43 |
| Aluminum Chloride | 5.33 | 0.27 |
| Aspartame | 72.00 | 3.60 |
| Avicel | 174.00 | 8.70 |

EXAMPLE 40

| MATRIX COMPRISED OF: | WEIGHT (grams) | PERCENT |
|---|---|---|
| Glycerin Monocaprolate | 1754.00 | 87.70 |
| Avicel | 174.00 | 8.70 |
| Aspartame | 72.00 | 3.60 |

EXAMPLE 41

| MATRIX COMPRISED OF: | WEIGHT (grams) | PERCENT |
|---|---|---|
| Glycerin Monocaprolate | 1749.00 | 87.45 |
| Avicel | 174.00 | 8.70 |
| Aspartame | 72.00 | 3.60 |
| Aluminum Sulfate | 5.00 | 0.25 |

Table 1 shows the relative percent of the initial aspartame content present in the gum compositions after the sticks of gum were maintained at 105° F. for the time periods set forth.

TABLE 1

| EXAMPLE NO. | ASPARTAME RETENTION (% OF INITIAL AMOUNT) | |
|---|---|---|
| | 1 MONTH | 7 WEEKS |
| 22 | 87.5 | 78.0 |
| 23 | 88.7 | 74.0 |
| 24 | 75.4 | 60.0 |
| 25 | 82.8 | 60.9 |
| 26 | 76.2 | NA* |
| 27 | 77.0 | NA |
| 28 | 79.7 | NA |
| 29 | 70.4 | 61.8 |
| 30 | 74.5 | NA |
| 31 | 71.3 | NA |
| 32 | 109.3 | 100.0 |
| 33 | 79.0 | NA |
| 34 | 98.6 | 78.0 |
| 35 | 73.2 | NA |
| 36 | 76.1 | NA |
| 37 | 67.4 | NA |
| 38 | 74.8 | NA |
| 39 | 81.7 | 79.9 |
| 40 | 46.6 | NA |
| 41 | 68.8 | NA |

NA* = Not Analyzed

The chewing gum compositions contemplated by the present invention comprise all types of chewing gums and chewing gum formulations known to those skilled in the art. For example, stick, slab and chunk sizes; sugarless, sugar sweetened and mixtures thereof; regular consistency, soft chew consistency, non-stick and bubble gum; and sugar and sugarless center filled gums are all contemplated by the invention.

While the foregoing examples used chewing gum formulations, the compositions of the present invention can be also used in other products using aspartame as a sweetener.

What is claimed is:

1. A comestible which comprises aspartame as a sweetener and an effective amount of an ingestible hydrotable hygroscopic metallic salt to stabilize the aspartame against decomposition.

2. The comestible of claim 1 wherein the metallic salt is aluminum sulfate.

3. The comestible of claim 1 wherein the metallic salt is calcium chloride.

4. The comestible of claim 1 wherein said metallic salt is present in the comestible in a weight amount of from about 0.5 to about 1.5 times the weight of aspartame present in the comestible divided by its moles of water of hydration.

5. The comestible of claim 4 wherein the amount of metallic salt present is between about 0.9 to about 1.1 times the weight of aspartame present divided by its moles of water of hydration.

6. The comestible of claim 1 wherein the comestible is chewing gum.

7. A method for stabilizing aspartame against decomposition comprising forming a composition including glycerin, an effective stabilizing amount of an hydratable hygroscopic metal salt and aspartame.

8. The method of claim 7 wherein the composition is mixed to form an aerated matrix.

9. The method of claim 8 wherein the matrix has a density between about 0.2 grams per milliliter and about 0.8 grams per milliliter.

10. A method for stabilizing aspartame comprising combining a liquid binding ingredient, a hydrotable ingredient, and aspartame and mixing to form an aerated matrix having aspartame dispersed throughout the matrix.

11. The method of claim 10 which further includes the step of mixing a suspending agent with said ingredients of the matrix.

12. The method of claim 11 wherein the liquid binding ingredient comprises glycerin, the hygroscopic ingredient comprises an ingestible metal salt and the suspending agent comprises microcrystalline cellulose.

13. The method of claim 12 wherein the metal salt is at least partially anhydrous and the metal salt is present in a weight amount equal to about 0.5 to about 1.5 times the weight of aspartame present divided by the moles of hydration of said metal salt.

14. The method of claim 13 wherein the metal salt is calcium chloride.

15. The method of claim 13 wherein the metal salt is aluminum sulfate.

16. A chewing gum composition containing substantially uncooked binding components and comprising gum base and unencapsulated aspartame mixed substantially throughout said base and binding components, and having an aspartame content approximately nine months after preparation of the chewing gum composition of at least about 50 weight percent of its initial aspartame content.

17. The chewing gum composition of claim 16 which further comprises an effective amount of an ingestible hydratable metal salt 18. The chewing gum composition of claim 17 which further comprises glycerine and wherein said aspartame and said metal salt are initially in the chewing gum composition together with said glycerine in the form of an aerated matrix.

19. The chewing gum composition of claim 18 which further comprises microcrystalline cellulose and wherein said matrix also includes said microcrystalline cellulose.

20. A composition useful for the sweetening of chewing gum which comprises an effective sweetening amount of a matrix comprising aspartame, microcrystalline cellulose and glycerin.

21. The composition of claim 20 wherein the matrix is an aerated matrix.

22. The composition of claim 21 wherein the matrix comprises from about 70 to about 90 weight percent glycerin, from about 1 to about 20 weight percent microcrystalline cellulose and from about 1 to about 10 weight percent aspartame.

23. The composition of claim 21 wherein the matrix has a density between about 0.2 and about 0.8 grams per milliliter.

24. The composition of claim 20 wherein the matrix further comprises sodium carboxymethyl cellulose.

25. The composition of claim 20 wherein the matrix further comprises an ingestible metal salt.

26. The composition of claim 25 wherein the metal salt can bind a given number of water molecules and said metal salt is present in a weight amount equal to about 0.5 to 1.5 times the weight of aspartame present divided by said given number.

27. The composition of claim 25 wherein the metal salt is aluminum sulfate.

28. The composition of claim 25 wherein the metal salt is calcium chloride.

29. In the method for the preparation of chewing gum comprising mixing gum base, flavor, bulking agents and aspartame, the improvement which comprises first forming a matrix comprising aspartame, glycerin and carboxymethyl cellulose and then combining an effective sweetening amount of the matrix with said other components of the gum.

30. The method of claim 29 wherein the matrix has a density between about 0.2 and about 0.8 grams per milliliter.

31. The method of claim 29 wherein the matrix also contains an ingestible hygroscopic metal salt.

32. The method of claim 31 wherein the metal salt is aluminum sulfate and said salt is present in a weight amount between 0.5 and 1.5 times the weight of aspartame present divided by said salt's value of available water of hydration.

33. The method of claim 31 wherein the metal salt is calcium chloride and said salt is present in a weight amount between 0.5 and 1.5 times the weight of aspartame present divided by said salt's value of available water of hydration.

34. The method of claim 29 wherein the matrix comprises from about 70 to about 90 weight percent glycerin, from about 1 to about 20 weight percent microcrystalline cellulose and from about 1 to about 10 weight percent aspartame.

35. The method of claim 29 wherein lecithin is also present in the gum.

36. The method of claim 29 wherein the bulking agent is a sugar alcohol.

37. The method of claim 36 wherein the sugar alcohol is selected from the group consisting of mannitol, sorbitol or xylitol or mixtures thereof.

38. A method of stabilizing aspartame from decomposition including preparing an aerated matrix of an effective sweetening amount of aspartame, microcrystalline cellulose suspending agent and glycerin binder by blending the aspartame, microcrystalline cellulose and glycerin to form a matrix having a density between 0.2 and about 0.8 grams per cc.

39. The method of claim 38 which further includes blending an ingestible hygroscopic metal salt with the aspartame, microcrystalline cellulose and glycerin.

40. The method of claim 38 wherein the aerated matrix comprises about 70 to 90 weight percent glycerin, from about 1 to about 20 weight percent microcrystalline cellulose and from about 1 to about 10 weight percent aspartame.

41. The method of claim 39 wherein the aerated matrix comprises about 70 to about 90 weight percent glycerin, from about 1 to about 20 weight percent microcrystalline cellulose, from about 1 to about 10 weight percent aspartame and the metal salt is present in an amount from about 0.5 to about 1.5 times the amount of aspartame divided by the average number of water molecules that can be bound by an average molecule of said salt.

42. A chewing gum composition comprising gum base and unencapsulated aspartame mixed substantially throughout said base, said composition having a substantial absence of cooked aqueous hydrogenated starch hydrolysate having a moisture content of 10±6% and having an aspartame content approximately nine months after preparation of the chewing gum composition of at least about 50 weight percent of its initial aspartame content.

43. The chewing gum composition of claim 42 which further comprises an effective amount of an ingestible hydratable hygroscopic metal salt.

44. The chewing gum composition of claim 43 which further comprises glycerine and wherein said aspartame and said metal salt are initially in the chewing gum composition together with said glycerine in the form of an aerated matrix.

45. The chewing gum composition of claim 44 which further comprises microcrystalline cellulose and wherein said matrix also includes said microcrystalline cellullose.

* * * * *